United States Patent
Noro

(10) Patent No.: US 9,526,026 B2
(45) Date of Patent: Dec. 20, 2016

(54) METHOD FOR CONTROLLING INFORMATION PROCESSING APPARATUS AND INFORMATION PROCESSING APPARATUS

(71) Applicant: FUJITSU LIMITED, Kawasaki-shi, Kanagawa (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 13/954,309

(22) Filed: Jul. 30, 2013

(65) Prior Publication Data

US 2014/0086053 A1   Mar. 27, 2014

(30) Foreign Application Priority Data

Sep. 21, 2012 (JP) .................................. 2012-208900

(51) Int. Cl.
| | |
|---|---|
| *H04W 28/02* | (2009.01) |
| *G06F 1/32* | (2006.01) |
| *H04W 52/02* | (2009.01) |

(52) U.S. Cl.
CPC .......... *H04W 28/0231* (2013.01); *G06F 1/324* (2013.01); *H04W 52/029* (2013.01); *Y02B 60/1217* (2013.01)

(58) Field of Classification Search
CPC ........... H04W 28/0231; H04W 52/029; H04W 24/00; G06F 1/324; Y02B 60/1217
USPC ............... 713/500, 600, 300, 322, 320, 501; 370/311, 235, 229, 252
See application file for complete search history.

(56) References Cited

U.S. PATENT DOCUMENTS

| | | | | |
|---|---|---|---|---|
| 7,711,966 | B2 * | 5/2010 | Prabhakaran et al. | ........ 713/300 |
| 8,370,663 | B2 * | 2/2013 | Frid | ...................... G06F 1/3203 713/310 |
| 2006/0047987 | A1 * | 3/2006 | Prabhakaran | ......... G06F 1/3203 713/322 |
| 2006/0230301 | A1 * | 10/2006 | He | ........................ G06F 1/3203 713/322 |
| 2006/0230304 | A1 * | 10/2006 | Sanada | ................. G06F 1/3203 713/600 |

(Continued)

FOREIGN PATENT DOCUMENTS

| | | |
|---|---|---|
| JP | 01-292416 | 11/1989 |
| JP | 2010-039791 | 2/2010 |

(Continued)

OTHER PUBLICATIONS

Office Action issued on Apr. 19, 2016 in Japanese Patent Application No. 2012-208900 (with partial English language translation).

*Primary Examiner* — Habte Mered
*Assistant Examiner* — Rownak Islam
(74) *Attorney, Agent, or Firm* — Oblon, McClelland, Maier & Neustadt, L.L.P.

(57) ABSTRACT

A method for controlling an information processing apparatus including a CPU that executes an application relevant to communication other than baseband processing, the method including controlling a variation in an operating frequency of the CPU, determining, using a processor, whether an amount of traffic per unit time of a wireless link changes after the variation in the operating frequency, and setting an operating frequency of the CPU based on a result of the determining whether an amount of traffic per unit time changes.

18 Claims, 23 Drawing Sheets

(56) References Cited

U.S. PATENT DOCUMENTS

| | | | | |
|---|---|---|---|---|
| 2007/0049133 A1* | 3/2007 | Conroy | ............... | G06F 1/3203 |
| | | | | 439/894 |
| 2009/0210654 A1* | 8/2009 | Koul | ............... | G06F 1/3203 |
| | | | | 712/25 |
| 2010/0037080 A1* | 2/2010 | Kawashima | ............... | G06F 1/3203 |
| | | | | 713/500 |
| 2010/0056046 A1* | 3/2010 | Tomoda | ............... | H04M 1/7253 |
| | | | | 455/41.1 |
| 2010/0316376 A1* | 12/2010 | Qiu | ............... | H04Q 11/0062 |
| | | | | 398/25 |
| 2013/0054989 A1* | 2/2013 | Judd | ............... | 713/320 |

FOREIGN PATENT DOCUMENTS

| | | |
|---|---|---|
| JP | 2011-70565 A | 4/2011 |
| WO | WO 2005/062156 A1 | 7/2005 |

\* cited by examiner

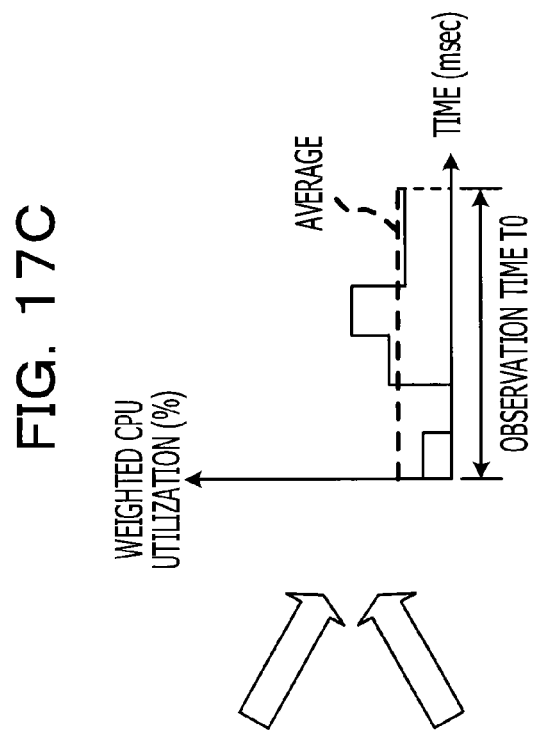
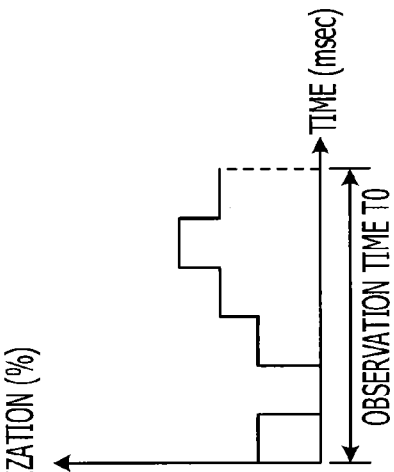
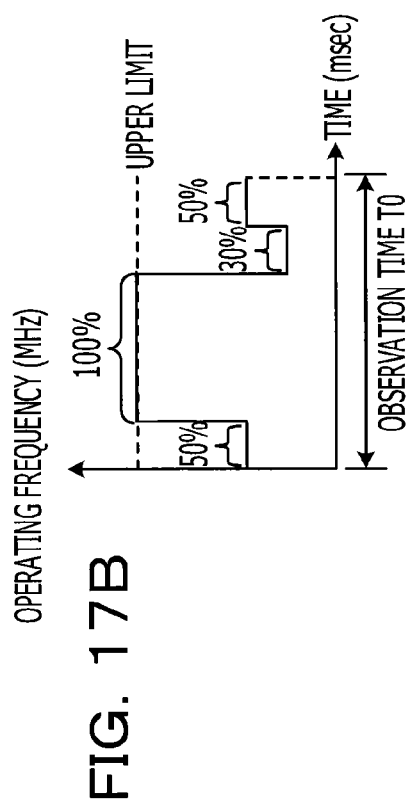
FIG. 17A
FIG. 17B
FIG. 17C

METHOD FOR CONTROLLING INFORMATION PROCESSING APPARATUS AND INFORMATION PROCESSING APPARATUS

CROSS-REFERENCE TO RELATED APPLICATION

This application is based upon and claims the benefit of priority from the prior Japanese Patent Application No. 2012-208900 filed on Sep. 21, 2012, the entire contents of which are incorporated herein by reference.

FIELD

The embodiments discussed herein are related to a method for controlling an information processing apparatus, a medium, and an information processing apparatus.

BACKGROUND

Portable terminal devices have recently become capable of causing a plurality of application programs to be executed simultaneously. The use case of "doing one thing while doing another thing", such as music playback by a music reproduction application running in the background while checking a weather report by a weather application running in the foreground, is becoming more common. Accordingly, the power consumption of portable terminal devices is increasing. It is thus becoming an important issue to reduce power consumption.

In the above circumstances, a setup of dynamically controlling the operating frequency of a CPU in a range from the upper limit to the lower limit of the operating frequency of the CPU in accordance with the processing load on the CPU to reduce power consumption has been developed. In this setup, for example, if the processing load on a CPU decreases, the operating frequency of the CPU automatically decreases; whereas if the processing load on the CPU increases, the operating frequency of the CPU automatically increases.

Japanese Laid-open Patent Publication Nos. 01-292416 and 2010-39791 disclose examples of the related art.

SUMMARY

According to an aspect of the invention, a method for controlling an information processing apparatus including a CPU that executes an application relevant to communication other than baseband processing, the method including controlling a variation in an operating frequency of the CPU, determining, using a processor, whether an amount of traffic per unit time of a wireless link changes after the variation in the operating frequency, and setting an operating frequency of the CPU based on a result of the determining whether an amount of traffic per unit time changes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 17A to 17C are graphs illustrating the varying operating frequency of the CPU according to a fifth embodiment;

DESCRIPTION OF EMBODIMENTS

While a portable terminal device is communicating, the processing capability of the CPU is sometimes insufficient, and, as a result, communication throughput does not sufficiently increase. If communication throughput does not sufficiently increase, the running times of devices contributing to communication become longer. As a result, the power consumption of the portable terminal device sometimes increases.

For this reason, when a portable terminal device is communicating, the upper limit of the operating frequency of the CPU may be increased so as to avoid a situation in which the processing capability of the CPU is a bottleneck to communication.

However, when the portable terminal device is communicating, the communication throughput sometimes does not sufficiently increase even if the upper limit of the operating frequency of the CPU is increased. For example, when the CPU is executing another application that is irrelevant to communication or when the communication throughput is suppressed due to circumstances of a server at the other end of communication or circumstances of the basic network, even if the upper limit of the operating frequency of the CPU is increased, the throughput of communication does not increase, and conversely, the power consumption of the portable terminal device may increase.

Therefore, in portable terminal devices according to embodiments described below, the operating frequency of a CPU is caused to vary, and the operating frequency of the CPU is decided based on the result of determining whether the amount of traffic of a wireless link changes after the operating frequency is varied.

First Embodiment

A first embodiment will be described below with reference to FIG. 1 to FIG. 7.

[Portable Terminal Device 100]

A portable terminal device 100 according to the first embodiment will now be described. Here, Android (registered trademark) is adopted as the operating system (OS) loaded onto the portable terminal device 100. However, aspects of the present disclosure are not limited to this, and an OS other than Android may be adopted. Examples of the portable terminal device 100 according to this embodiment include, but are not limited to, portable information processing devices, such as a smart phone and a tablet PC.

[Hardware of Portable Terminal Device 100]

Figure 1:
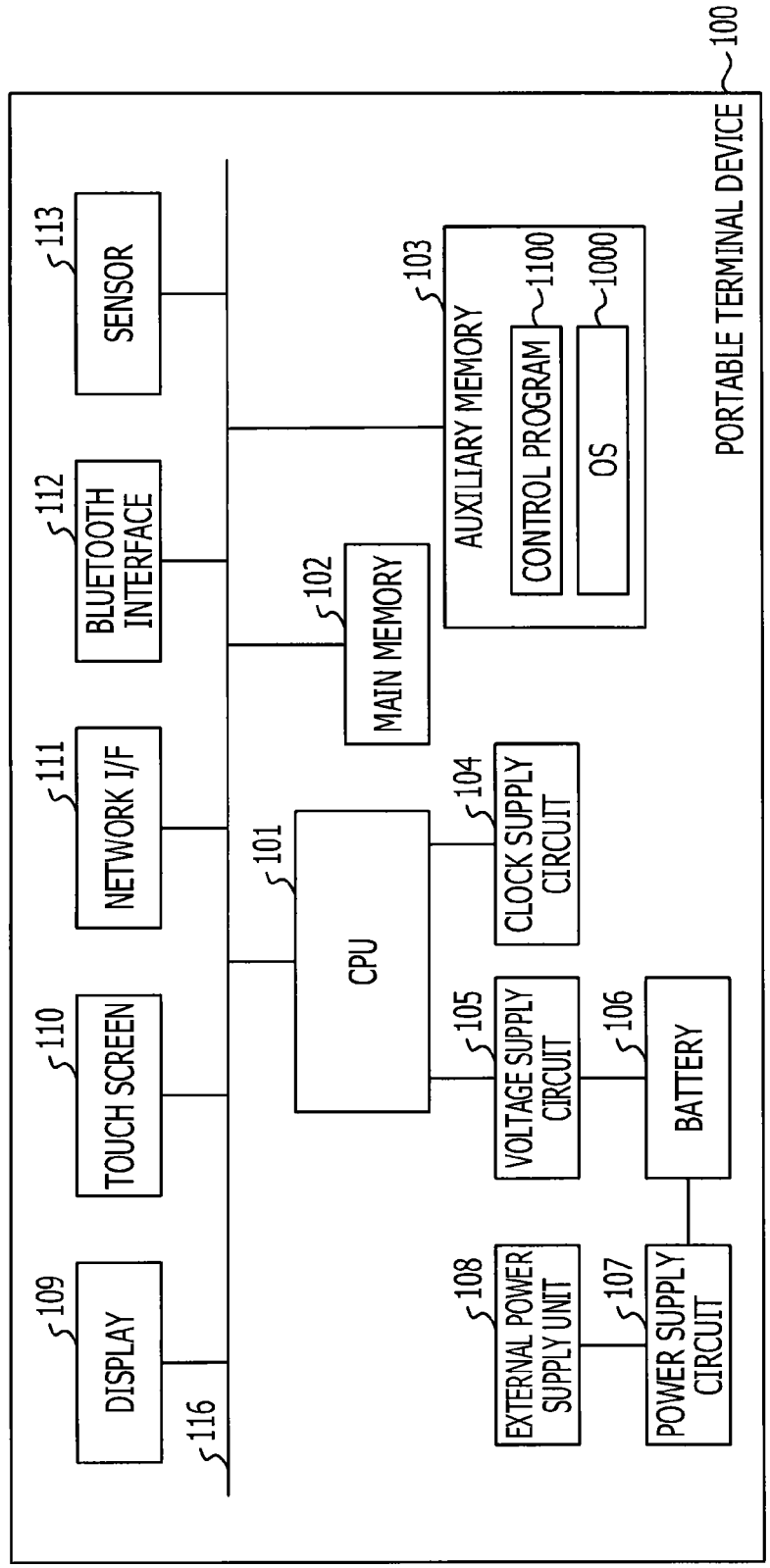
FIG. 1 is a schematic diagram of a hardware configuration of a portable terminal device according to a first embodiment.

FIG. 1 is a schematic diagram of a hardware configuration of the portable terminal device 100 according to the first embodiment.

As illustrated in FIG. 1, the portable terminal device 100 according to this embodiment includes as hardware modules a central processing unit (CPU) 101, a main memory 102, an auxiliary memory 103, a clock supply circuit 104, a voltage supply circuit 105, a battery 106, a power supply circuit 107, an external power supply unit 108, a display 109, a touch screen 110, a network interface (I/F) 111, a Bluetooth I/F 112, and a sensor 113. These hardware modules are interconnected by a bus 116.

The CPU 101 is assumed to be a processor that executes application programs, rather than a baseband large scale integrated (LSI) circuit. The CPU 101 operates with a clock signal supplied from the clock supply circuit 104 and a voltage supplied from the voltage supply circuit 105 to control various hardware modules of the portable terminal device 100. The CPU 101 has a plurality of operating frequency set values, and operates at a specified operating frequency substantially equal to one of the set values. Additionally, the CPU 101 reads various programs stored in the auxiliary memory 103 into the main memory 102 and executes the various programs read into the main memory 102, to thereby implement various functions. Details of the various functions will be described later.

The main memory 102 stores various programs to be executed by the CPU 101. Additionally, the main memory 102 is used as a work area of the CPU 101 and stores various data for processing to be performed by the CPU 101. A random access memory (RAM) or the like, for example, may be used as the main memory 102.

The auxiliary memory 103 stores various programs for operating the portable terminal device 100. Examples of the various programs include application programs to be executed by the portable terminal device 100, as well as an OS 1000 serving as an execution environment for application programs. A control program 1100 according to this embodiment is also stored in the auxiliary memory 103. A nonvolatile memory, such as a hard disk or a flash memory, for example, may be used as the auxiliary memory 103.

The clock supply circuit 104 generates clock signals for supply to the CPU 101. The clock supply circuit 104 may be implemented by a quartz crystal resonator that oscillates clock signals and a real time clock (RTC), for example.

The voltage supply circuit 105 generates a variable voltage to be supplied to the CPU 101 based on power supplied from the power supply circuit 107. The voltage supply circuit 105 may be implemented by a voltage detector and a voltage regulator.

The battery 106 supplies power to the power supply circuit 107. The battery 106 may be implemented by a battery, such as a lithium ion battery, and a battery protection integrated circuit (IC), for example.

The power supply circuit 107 supplies power supplied from the battery 106 through a power source wire (not illustrated) to various hardware modules of the portable terminal device 100. Note that if an external power supply (not illustrated) is connected to the external power supply unit 108, the power supply circuit 107 may supply power supplied from the external power supply unit 108 to various hardware modules of the portable terminal device 100. The power supply circuit 107 may be implemented by a switching regulator and a voltage regulator, for example.

The display 109 is controlled by the CPU 101 and displays image information that is presented to the user. The touch screen 110 is laminated on the display 109, and inputs to the CPU 101 information on locations at which the user's fingertip, a nib, or the like comes into contact with the touch screen 110. In this embodiment, the touch screen 110 is used as a location input device for the user's operations.

The network I/F 111 is controlled by the CPU 101 and functions as an interface for communication conducted using global positioning system (GPS), 3rd generation (3G), or wireless local area network (WLAN) technology, for example.

The sensor 113 acquires state information of the portable terminal device 100. Examples of the sensor 113 include an accelerometer, a gyroscope sensor, an illuminance sensor, a geomagnetism sensor, an inclination sensor, a pressure sensor, a proximity sensor, and a temperature sensor.

[Functional Block of Portable Terminal Device 100]

Figure 2:
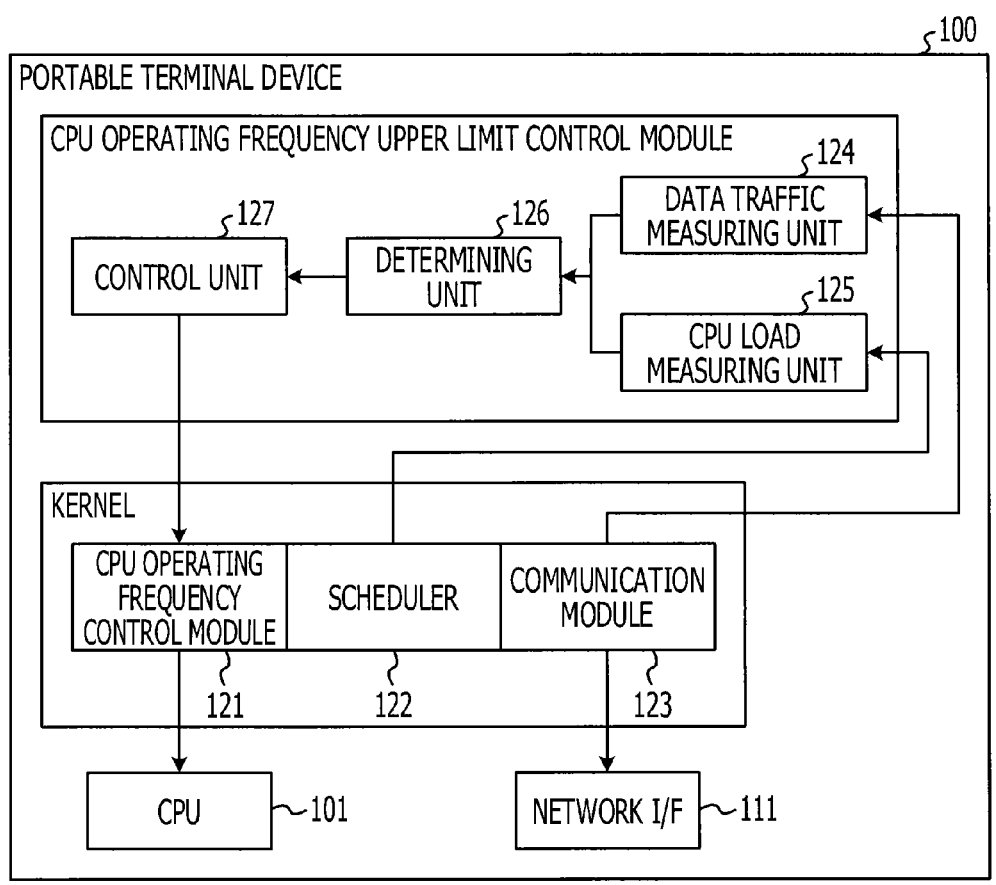
FIG. 2 is a schematic diagram of functional blocks of the portable terminal device according to the first embodiment.

FIG. 2 is a schematic diagram of functional blocks of the portable terminal device 100 according to the first embodiment.

As illustrated in FIG. 2, the portable terminal device 100 according to this embodiment includes a CPU operating frequency control module 121, a scheduler 122, a communication module 123, a data traffic measuring unit 124, a CPU load measuring unit 125, a determining unit 126, and a controller 127.

Among these, the data traffic measuring unit 124, the CPU load measuring unit 125, the determining unit 126, and the controller 127 make up a "CPU operating frequency upper limit control module" for setting the upper limit of the operating frequency of the CPU 101.

[OS 1000]

The CPU operating frequency control module 121, the scheduler 122, and the communication module 123 are each implemented so that the CPU 101 reads the kernel of the OS 1000 into the main memory 102 and executes that kernel read into the main memory 102.

(CPU Operating Frequency Control Module 121)

The CPU operating frequency control module 121 dynamically sets the operating frequency of the CPU 101 based on a load imposed on the CPU (hereinafter referred to as a "CPU load"), which is managed by the scheduler 122, and the upper limit and lower limit of the operating frequency of the CPU 101, which are set by the controller 127. Specifically, the CPU operating frequency control module 121 will set, for the CPU 101, the lowest (minimum) operating frequency at which the CPU utilization is larger than a threshold, out of a plurality of set operating frequency values provided for the CPU 101. This enables the CPU 101 to provide just enough processing capability for the CPU load. Note that the upper limit and lower limit of the operating frequency are parameters set by the controller 127.

(Scheduler 122)

The scheduler 122 calculates CPU utilization based on the process performance information managed by the OS 1000. The CPU utilization is the proportion of the processing time of the CPU 101 exclusively used for the OS and application programs in a unit period of time.

(Communication Module 123)

The communication module 123 manages transmission and reception of data over the network I/F 111, that is, data coming in and going out through the network I/F 111. The communication module 123 manages the cumulative value for the amount of data passing through the network I/F 111. Additionally, the communication module 123 stores a bandwidth with which the portable terminal device 100 is able to communicate.

[Control Program 1100]

The data traffic measuring unit 124, the CPU load measuring unit 125, the determining unit 126, and the controller 127 are each implemented so that the CPU 101 reads the control program 1100 into the main memory 102 and executes that control program 1100 read into the main memory 102.

(Data Traffic Measuring Unit 124)

The data traffic measuring unit 124 regularly acquires the cumulative traffic of a wireless link managed by the communication module 123, for example, at intervals of 10 to 1000 msec, and calculates the amount of traffic per unit time (bits per second—bps) of the communication module 123. Additionally, based on the amount of traffic per unit time, the data traffic measuring unit 124 determines a change state of the amount of traffic of the communication module 123, that is, whether the amount of traffic tends to increase, tends to decrease, or is stable. Then, the data communication measuring unit 124 notifies the determining unit 126 of the change state of the amount of traffic or the amount of traffic per unit time.

(CPU Load Measuring Unit 125)

The CPU load measuring unit 125 regularly acquires the CPU load from the scheduler 122, for example, at intervals of 10 to 1000 msec. Additionally, the CPU load measuring unit 125 determines whether the CPU load acquired from the scheduler 122 exceeds a threshold that is stored in advance. If the CPU load exceeds the threshold, the CPU load measuring unit 125 issues an instruction to control the upper limit of the operating frequency of the CPU to the determining unit 126.

Note that the CPU utilization is used as the CPU load in this embodiment. The CPU utilization is the proportion of the operating time for programs in a unit period of time. However, this embodiment is not limited to this, and the average number of processes waiting for assignment to the CPU, for example, may be used instead of the CPU utilization. The average number of processes waiting for assignment to the CPU is an index proportional to the CPU utilization and is able to be easily read from middleware and applications. For this reason, use of the average number of processes waiting for assignment to the CPU allows implementation in the portable terminal device 100 to be simple.

(Determining Unit 126)

When the instruction to control the upper limit of the operating frequency of the CPU is issued by the CPU load measuring unit 125, the determining unit 126 determines, based on the change state of the amount of traffic or the amount of traffic per unit time, whether the upper limit of the operating frequency of the CPU 101 is to be increased, decreased, or maintained intact.

(Controller 127)

Based on the result of the determination made by the determining unit 126, the controller 127 decides the upper limit of the operating frequency of the CPU 101, and notifies the CPU operating frequency control module 121 of the determined upper value. The upper limit of the operating frequency is set to any one of a plurality of operating frequencies that the CPU 101 has. Accordingly, the controller 127 issues an instruction to increase the upper limit of the operating frequency of the CPU 101 by one rank, or an instruction for decreasing the upper limit by one rank to the CPU operating frequency control module 121.

[CPU Operating Frequency Upper Limit Control Processing]

Figure 3:
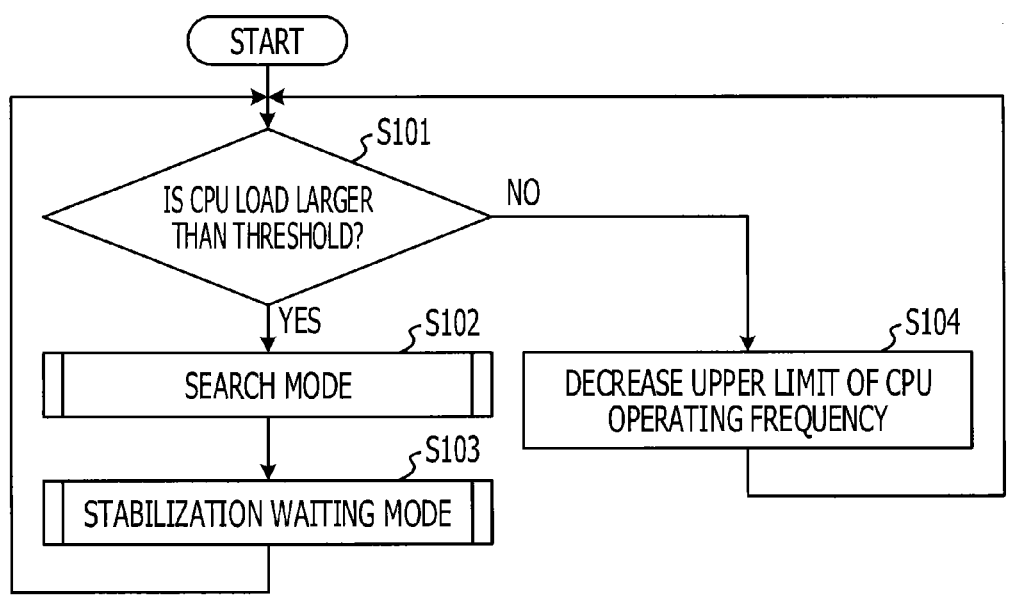
FIG. 3 is a flowchart of CPU operating frequency upper limit control processing according to the first embodiment.
Figure 4:
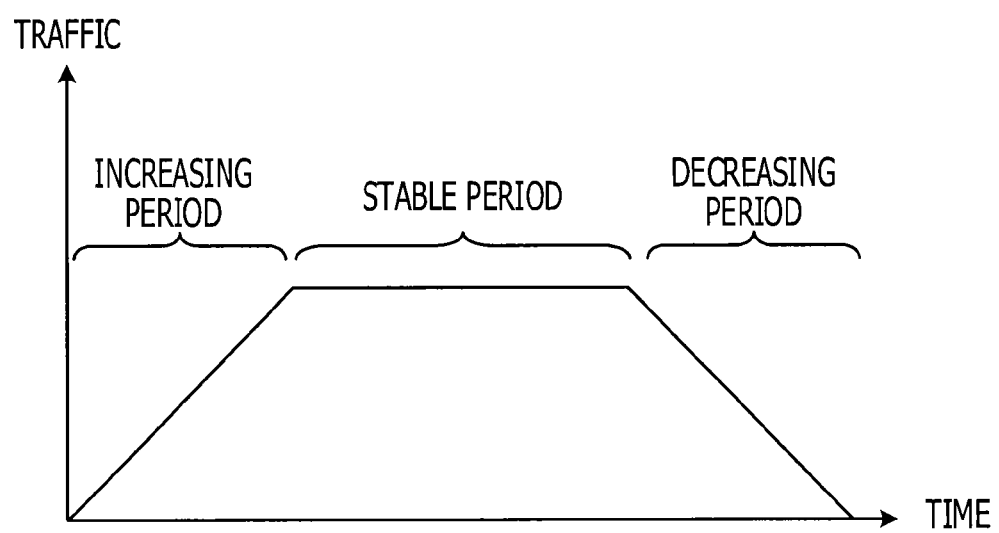
FIG. 4 is a graph illustrating changes in the amount of traffic according to the first embodiment.

FIG. 3 is a flowchart of CPU operating frequency upper limit control processing according to the first embodiment. FIG. 4 is a graph illustrating changes in the amount of traffic according to the first embodiment.

As illustrated in FIG. 3, first, the determining unit 126 determines whether the CPU load is larger than a threshold set in advance based on the CPU load acquired by the CPU load measuring unit 125 (step S101).

Here, if it is determined that the CPU load is larger than the threshold ("Yes" in step S101), there is a possibility that the processing capability of the CPU 101 may become a bottleneck for communication. The determining unit 126 therefore provides an instruction to start a "search mode", which is a subroutine (step S102). The "search mode" is a mode in which the setting of the upper limit of the operating frequency of the CPU 101 is optimized during communication conducted by the communication module 123. Details of the "search mode" will be described later.

Then, after the completion of the "search mode" the controller 127 provides an instruction to start a "stabilization waiting mode", which is a subroutine (step S103). The "stabilization waiting mode" is a mode in which stabilization of the amount of traffic of the communication module 123 is waited for. That is, the "search mode" is carried out when the amount of traffic of the communication module 123 is stable, that is, in a stable period (refer to FIG. 4). Details of the "stabilization waiting mode" will be described later.

However, if it is determined that the CPU load is not larger than the threshold ("No" in step S101), it is presumed that far from the processing capability of the CPU 101 being a bottleneck for communication, there is room for to decrease the upper limit of the operating frequency of the CPU 101. The controller 127 therefore instructs the CPU operating frequency control module 121 to decrease the upper limit of the operating frequency of the CPU 101. Based on the instruction from the controller 127, the CPU operating frequency control module 121 decreases the upper limit of the operating frequency of the CPU 101 by one rank (step S104). The CPU operating frequency upper limit control module performs the CPU operating frequency upper limit control processing at regular intervals.

As described above, in this embodiment, if the CPU load is larger than the threshold, it is determined that there is no margin in the processing capability of the CPU 101, that is, there is a possibility that the processing capability of the CPU 101 becomes a bottleneck for communication, and the below "search mode" and "stabilization waiting mode" is carried out.

If the CPU load is smaller than the threshold, it is determined that there is room to move with regards to the processing capability of the CPU 101, that is, the processing capability of the CPU 101 does not become a bottleneck for communication, and the upper limit of the operating frequency is decreased for the purpose of power-saving for the portable terminal device 100.

[Stabilization Waiting Mode]

Figure 5:
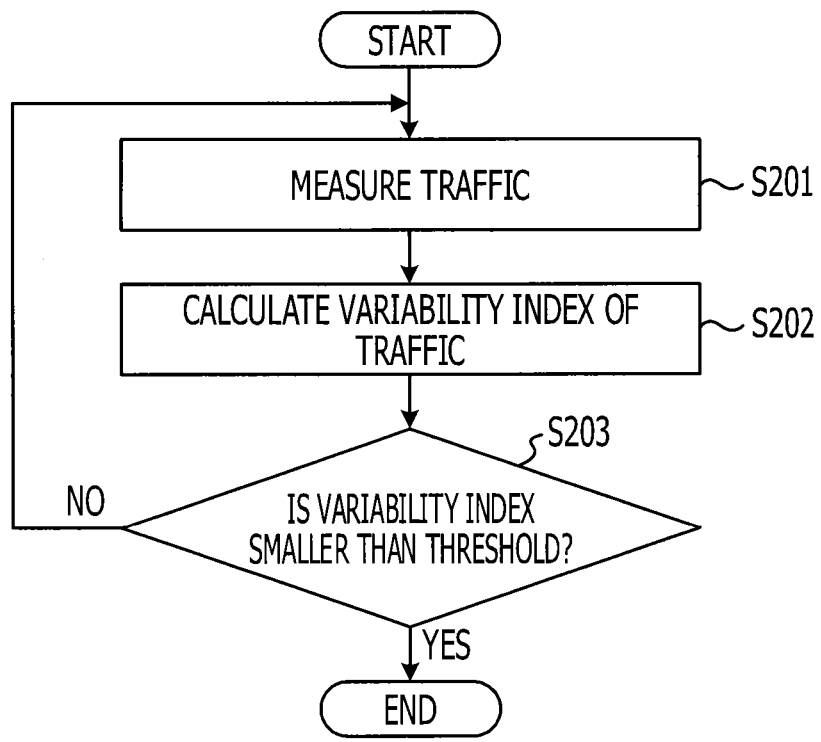
FIG. 5 is a flowchart of a "stabilization waiting mode" according to the first embodiment.

FIG. 5 is a flowchart of the "stabilization waiting mode" according to the first embodiment.

As illustrated in FIG. 5, after the start of the "stabilization waiting mode", the data traffic measuring unit 124 first acquires the amount of traffic of the communication module 123 (step S201). The number of bits per unit time (bps), for example, may be used as the amount of traffic although the amount of traffic is not limited to this.

Then, the determining unit 126 calculates the variability index of the amount of traffic based on the amount of traffic acquired by the data traffic measuring unit 124 (step S202). Specifically, the determining unit 126 calculates the variability index of the amount of traffic by using expression (1).

$$\text{Variability Index of the Amount of Traffic} = \frac{|\text{Current Amount of Traffic (bits)} - \text{Previous Amount of Traffic (bits)}|}{\text{Current Amount of Traffic (bit)}} \quad (1)$$

The variability index of the amount of traffic indicates the extent of a variation of the amount of traffic acquired in the current measurement from the amount of traffic acquired in the previous measurement. That is, it is determined that the smaller the variability index, the more stable the amount of traffic.

Note that although the variability index of the amount of traffic is calculated by using expression (1) in this embodiment, the present disclosure is not limited to this. If an index that makes it possible to determine whether the amount of traffic has stabilized, a moving weighted average or the like may be used.

Next, the determining unit 126 determines whether the variability index of the amount of traffic is smaller than a threshold set in advance, that is, whether the amount of traffic of the communication module 123 is stable (step S203).

Here, if it is determined that the variability index of the amount of traffic is smaller than the threshold ("Yes" in step S203), that is, if it is determined that the amount of traffic is stable, the determining unit 126 ends the "stabilization waiting mode".

However, if it is determined that the variability index of the amount of traffic is not smaller than the threshold ("No" in step S203), that is, if it is determined that the amount of traffic is not stable, the data measuring unit 124 again acquires the amount of traffic of the communication module 123 (step S201). That is, the stabilization waiting mode is carried out again.

As described above, in this embodiment, after the completion of the "search mode", the "stabilization waiting mode" is carried out until the amount of traffic of the communication module 123 has stabilized. Accordingly, the "search mode" for optimizing the setting of the upper limit of the operating frequency of the CPU 101 starts after the amount of traffic of the communication module 123 has stabilized.

[Search Mode]

Figure 6:
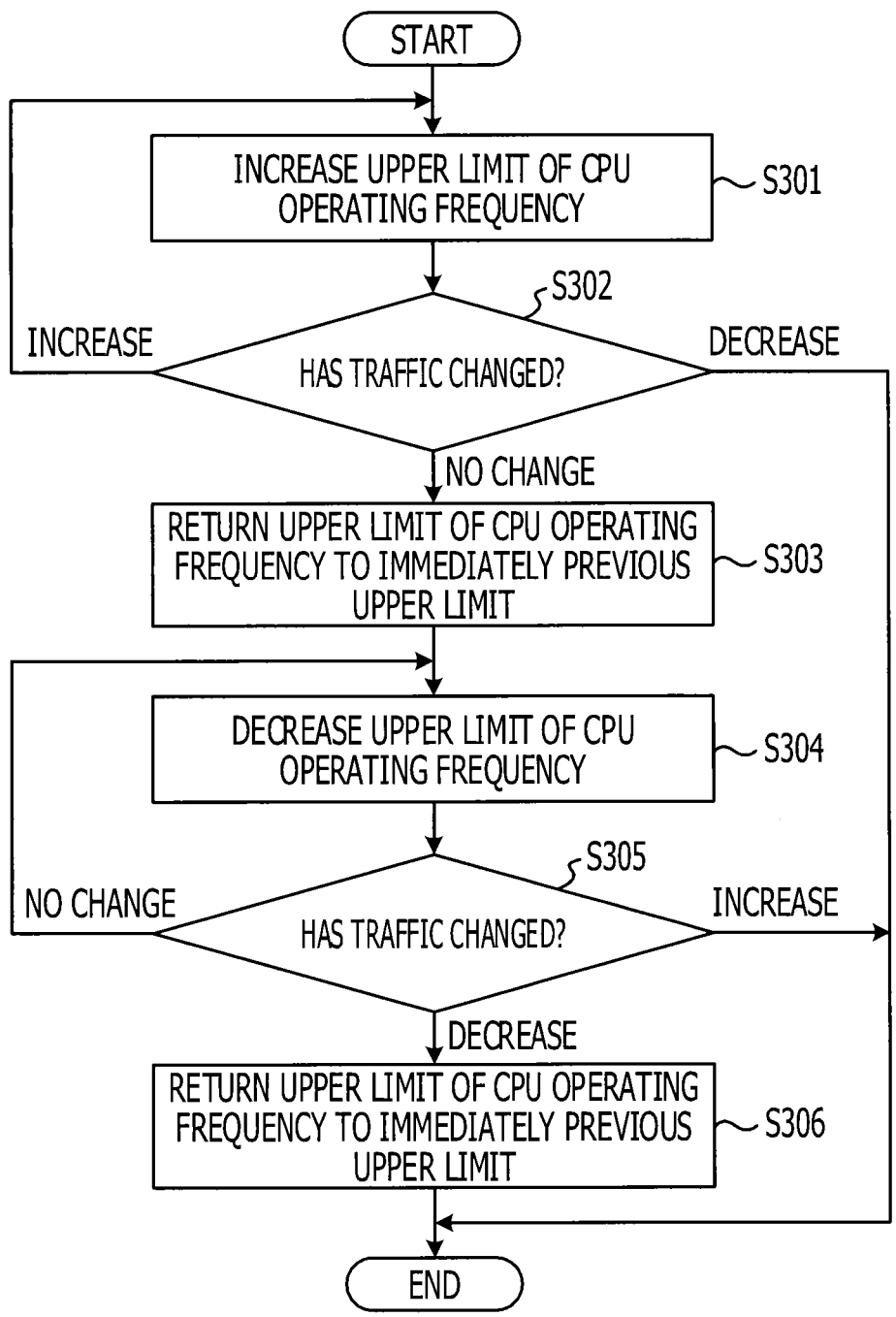
FIG. 6 is a flowchart of a "search mode" according to the first embodiment.

FIG. 6 is a flowchart of the "search mode" according to the first embodiment.

As illustrated in FIG. 6, after the start of the "search mode", the controller 127 first instructs the CPU operating frequency control module 121 to increase the upper limit of the operating frequency of the CPU 101. Based on the instruction from the controller 127, the CPU operating frequency control module 121 increases the setting of the upper limit of the operating frequency of the CPU 101 by one rank (step S301).

Then, the determining unit 126 determines based on the amount of traffic acquired by the data traffic measuring unit 124 whether the amount of traffic of the communication module 123 has increased, has decreased, or has not changed relative to the amount of traffic of the previous measurement (step S302). That is, it is determined how the amount of traffic changes when the setting of the upper limit of the operating frequency of the CPU 101 is increased by one rank.

Here, if it is determined that the amount of traffic has increased ("increase" in step S302), it is presumed that the processing capability of the CPU 101 has become a bottleneck for communication. The controller 127 therefore instructs the CPU operating frequency control module 121 to increase the upper limit of the operating frequency of the CPU 101. Based on the instruction from the controller 127, the CPU operating frequency control module 121 further increases the setting of the upper limit of the operating frequency of the CPU 101 by one rank (step S301).

However, if it is determined that the amount of traffic has decreased ("decrease" in step S302), the decrease is presumed to have been caused by an event irrelevant to the processing capability of the CPU 101 since the amount of traffic has decreased in spite of the increase in the upper limit of the operating frequency of the CPU 101. For example, the amount of traffic is presumed to have decreased because of a change in the communication environment or so on. For this reason, the controller 127 terminates the "search mode" without controlling the upper limit of the operating frequency of the CPU 101.

Also, if it is determined that the amount of traffic has not changed ("no change" in step S302), it is presumed that the processing capability of the CPU 101 has become no longer a bottleneck for communication because of the increase in the upper limit of the operating frequency of the CPU 101. The controller 127 therefore instructs the CPU operating frequency control module 121 to decrease the upper limit of the operating frequency of the CPU 101. Based on the instruction from the controller 127, the CPU operating frequency control module 121 changes the setting of the upper limit of the operating frequency of the CPU 101 to the immediately previous upper limit (step S303). That is, the immediately previous upper limit of the operating frequency is presumed to be the optimum value, and the setting of the upper limit of the operating frequency of the CPU 101 is returned to the immediately previous upper limit.

As described above, in this embodiment, the operating frequency of the CPU 101 is sequentially increased by one rank until the amount of traffic no longer increases, to thereby solve a situation where the processing capability of the CPU 101 is a bottleneck for communication.

Next, the controller 127 instructs the CPU operating frequency control module 121 to decrease the upper limit of the operating frequency of the CPU 101. Based on the instruction from the controller 127, the CPU operating frequency control module 121 decreases the setting of the upper limit of the operating frequency of the CPU 101 by one rank (step S304).

Then, the determining unit 126 determines, based on an amount of traffic acquired by the data traffic measuring unit 124, whether the amount of traffic of the communication module 123 has increased, has decreased, or has not changed relative to the amount of traffic of the previous measurement (step S305).

Here, if it is determined that the amount of traffic has not changed ("no change" in step S305), it is presumed that far from the processing capability of the CPU 101 being a bottleneck for communication, there is room to decrease the upper limit of the operating frequency of the CPU 101. The controller 127 therefore instructs the CPU operating frequency control module 121 to decrease the upper limit of the operating frequency of the CPU 101. Based on the instruction from the controller 127, the CPU operating frequency control module 121 further decreases the setting of the upper limit of the operating frequency of the CPU 101 by one rank (step S304).

However, if it is determined that the amount of traffic has decreased ("decrease" in step S305), it is presumed that the processing capability of the CPU 101 has become a bottleneck for communication because of the decrease in the upper limit of the operating frequency of the CPU 101. The controller 127 therefore instructs the CPU operating frequency control module 121 to increase the upper limit of the operating frequency of the CPU 101. Based on the instruction from the controller 127, the CPU operating frequency control module 121 changes the setting of the upper limit of the operating frequency of the CPU 101 to the immediately previous upper limit (step S306). That is, the immediately previous upper limit of the operating frequency is presumed to be the optimum value, and the setting of the upper limit of the operating frequency of the CPU 101 is returned to the immediately previous upper limit.

If it is determined that the amount of traffic has increased ("increase" in step S305), the increase is presumed to have been caused by an event irrelevant to the processing capability of the CPU 101 since the amount of traffic has increased in spite of the decrease in the upper limit of the operating frequency of the CPU 101. For example, the amount of traffic is presumed to have increased because of a change in the communication environment and so on. For this reason, the controller 127 terminates the "search mode" without controlling the upper limit of the operating frequency of the CPU 101.

As described above, in this embodiment, when the processing capability of the CPU 101 is a bottleneck, the setting of the upper limit of the operating frequency of the CPU 101 is sequentially increased by one rank until the amount of traffic no longer increases, that is, until the processing capability of the CPU 101 is not a bottleneck for communication. Therefore, a situation where the processing capability of the CPU 101 is a bottleneck for communication may be easily solved. In this way, communication of the communication module 123 is no longer inhibited because of the processing capability of the CPU 101, and thus the time from the start to end of communication may be shortened. Therefore, the running times of the network I/F 111 and the like may be shortened, for example, and, as a result, the power consumption of the portable terminal device 100 may be restrained.

Additionally, in this embodiment, when the processing capability of the CPU 101 is not a bottleneck for communication, the setting of the upper limit of the operating frequency of the CPU 101 is sequentially decreased by one rank until the amount of traffic decreases, that is, until the processing capability of the CPU 101 becomes a bottleneck for communication. Therefore, a situation where the processing capability of the CPU 101 is not controlled to a minimum necessity, that is, a situation where the CPU 101 exhibits an excessive processing capability may be easily solved. The power consumption of the CPU 101 thereby becomes suitable for the CPU load, enabling the power consumption of the portable terminal device 100 to be restrained.

[State Transition Caused by Operating Frequency Upper Limit Control Processing]

Figure 7:
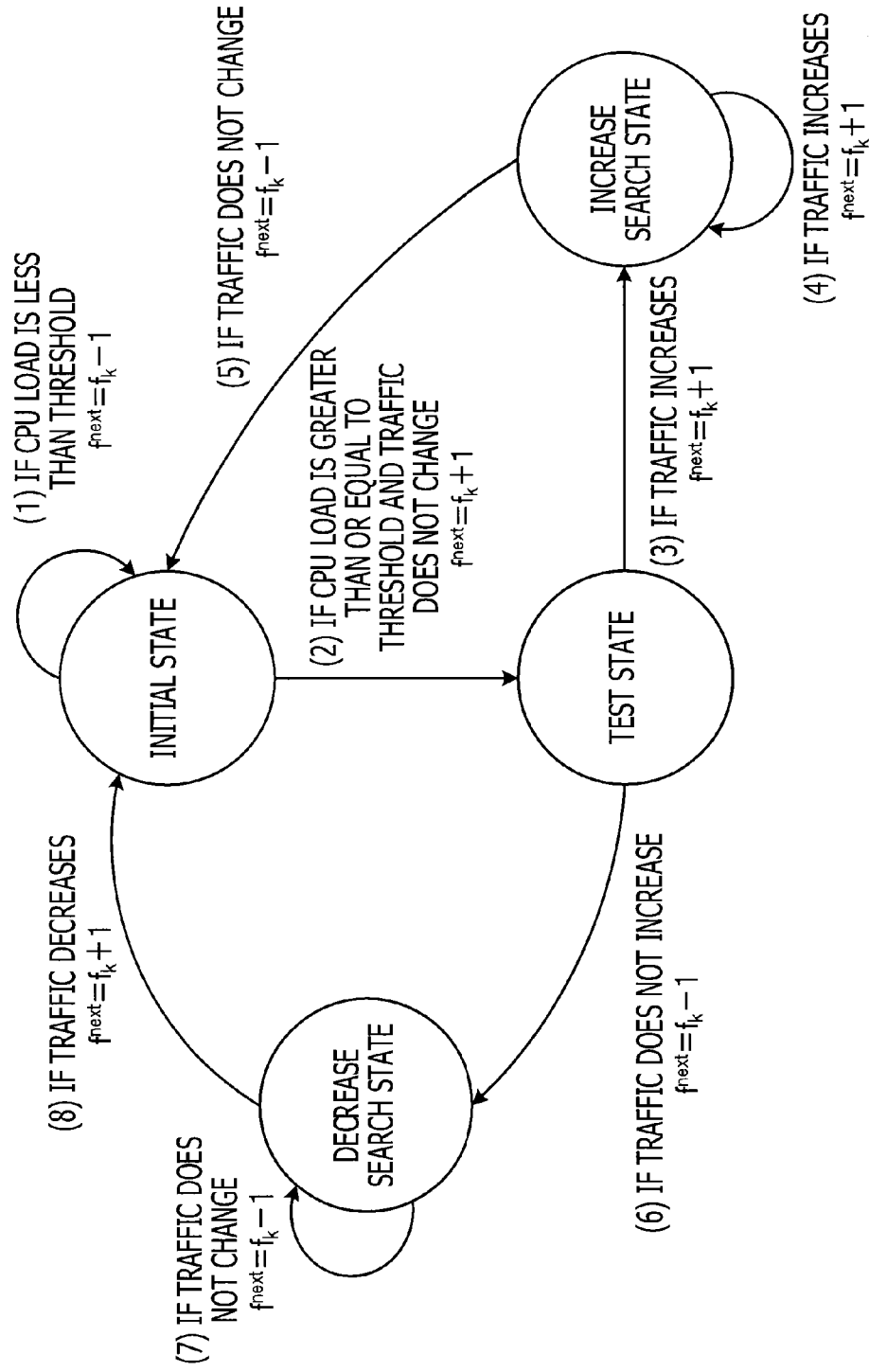
FIG. 7 is a state transition diagram of the CPU operating frequency upper limit control processing according to the first embodiment.

FIG. 7 is a state transition diagram of the CPU operating frequency upper limit control processing according to the first embodiment.

As illustrated in FIG. 7, an initial state, a test state, an increase search state, and a decrease search state are defined in the CPU operating frequency upper limit control processing.

First, (1) in the initial state, if the CPU load is less than a threshold, the upper limit of the operating frequency of the CPU 101 is decreased by one rank as represented by "$f^{next}=f_{k-1}$" in the drawing. The initial state continues until the CPU load is greater than or equal to the threshold and the amount of traffic no longer changes.

(2) However, if in the initial state the CPU load is greater than or equal to the threshold and the amount of traffic does not change (the amount of traffic is stable), the upper limit of the operating frequency of the CPU 101 is increased by one rank, making a transition to the test state.

(3) In the test state, if the amount of traffic increases, the upper limit of the operating frequency of the CPU 101 is increased by one rank as represented by "$f^{next}=f_{k+1}$" in the drawing, making a transition to the increase search state.

(4) In the increase search state, if the amount of traffic has increased, the upper limit of the operating frequency of the CPU 101 is increased by one rank as represented by "$f^{next}=f_{k+1}$" in the drawing. The increase search state continues until the amount of traffic no longer increases.

(5) In the increase search state, if the amount of traffic does not change, the upper limit of the operating frequency of the CPU 101 is decreased by one rank as represented by, "$f^{next}=f_{k-1}$" in the drawing, making a transition to the initial state. In the increase search state, however, if the amount of traffic decreases, a transition to the initial state is made without causing a variation in the upper limit of the operating frequency of the CPU 101.

(6) In the test state, however, if the amount of traffic does not increase, the upper limit of the operating frequency of the CPU 101 is decreased by one rank as represented by "$f^{next}=f_{k-1}$" in the drawing, making a transition to the decrease search state.

(7) In the decrease search state, if the amount of traffic does not change, the upper limit of the operating frequency of the CPU 101 is decreased by one rank as represented by "$f^{next}=f_{k-1}$" in the drawing. The decrease search state continues until the amount of traffic no longer changes.

(8) In the decrease search state, if the amount of traffic decreases, the upper limit of the operating frequency of the CPU 101 is increased by one rank as represented by "$f^{next}=f_{k+1}$" in the drawing, making a transition to the initial state. In the decrease search state, however, if the amount of traffic increases, a transition to the initial state is made without causing a variation in the upper limit of the operating frequency of the CPU 101.

Second Embodiment

A second embodiment will be described below with reference to FIG. 8 to FIG. 12. However, descriptions of configurations and functions equivalent to those of the first embodiment will be omitted.

[CPU Operating Frequency Upper Limit Control Processing]

Figure 8:
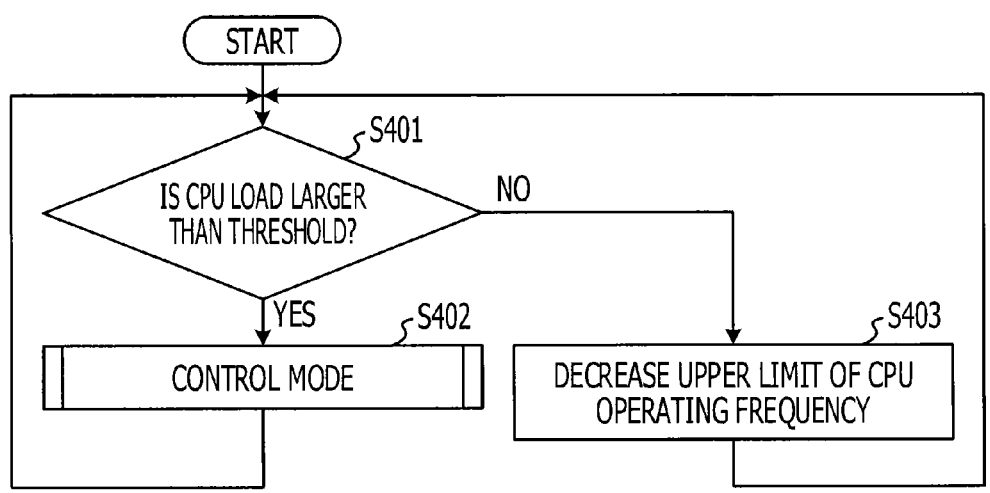
FIG. 8 is a flowchart of CPU operating frequency upper limit control processing according to a second embodiment.

FIG. 8 is a flowchart of CPU operating frequency upper limit control processing according to the second embodiment.

As illustrated in FIG. 8, first, the determining unit 126 determines, based on a CPU load acquired by the CPU load measuring unit 125, whether the CPU load is larger than a threshold set in advance (step S401).

Here, if it is determined that the CPU load is larger than the threshold ("Yes" in step S401), there is a possibility that the processing capability of the CPU 101 may become a bottleneck for communication. The determining unit 126 therefore provides an instruction to start a "control mode", which is a subroutine (step S402). The "control mode" is a mode in which the setting of the upper limit of the operating frequency of the CPU 101 is optimized while the communication module 123 is communicating. Details of the "control mode" will be described later.

However, if it is determined that the CPU load is not larger than the threshold ("No" in step S401), far from the processing capability of the CPU 101 is presumed being a bottleneck for communication, it is presumed that there is room to decrease the upper limit of the operating frequency of the CPU 101. The controller 127 therefore instructs the CPU operating frequency control module 121 to decrease the upper limit of the operating frequency of the CPU 101. Based on the instruction from the controller 127, the CPU operating frequency control module 121 decreases the setting of the upper limit of the operating frequency of the CPU 101 by one rank (step S403).

[Control Mode]

Figure 9:
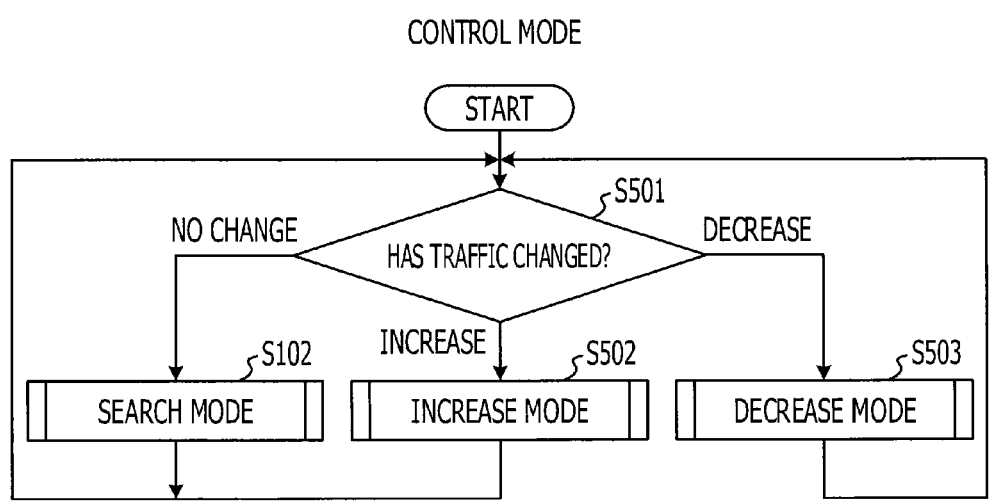
FIG. 9 is a flowchart of a "control mode" according to the second embodiment.

FIG. 9 is a flowchart of a "control mode" according to the second embodiment.

As illustrated in FIG. 9, after the start of the "control mode", the determining unit 126 determines, based on an amount of traffic acquired by the data traffic measuring unit 124, whether the amount of traffic of the communication module 123 has increased, has decreased, or has not changed relative to the amount of traffic of the previous measurement (step S501).

Here, if it is determined that the amount of traffic has not changed ("no change" in step S501), that is, if it is determined that the amount of traffic is stable, the determining unit 126 provides an instruction to start a "search mode", which is a subroutine (step S102). Note that the "search mode" here is equivalent to the "search mode" according to the first embodiment.

However, if it is determined that the amount of traffic has increased ("increase" in step S501), the determining unit 126 provides an instruction to start an "increase mode", which is a subroutine (step S502). The "search mode" is a mode in which when the amount of traffic of the communication module 123 tends to increase, that is, in an increasing period (refer to FIG. 4), the setting of the upper limit of the operating frequency of the CPU 101 is controlled in advance so that the processing capability of the CPU 101 will not be a bottleneck for future communication. That is, the "increase mode" is carried out when the amount of traffic of the communication module 123 tends to increase. Details of the "increase mode" will be described later.

Also, if it is determined that the amount of traffic has decreased ("decrease" in step S501), the determining unit 126 provides an instruction to start a "decrease mode", which is a subroutine (step S503). The "decrease mode" is a mode in which when the amount of traffic of the communication module 123 tends to decrease, that is, in a decreasing period (refer to FIG. 4), the setting of the upper limit of the operating frequency of the CPU 101 is controlled in advance so as to inhibit the CPU 101 from manifesting excessive processing capability. That is, the "decrease mode" is carried out when the amount of traffic of the communication module 123 tends to decrease. Details of the "decrease mode" will be described later.

[Increase Mode]

Figure 10:
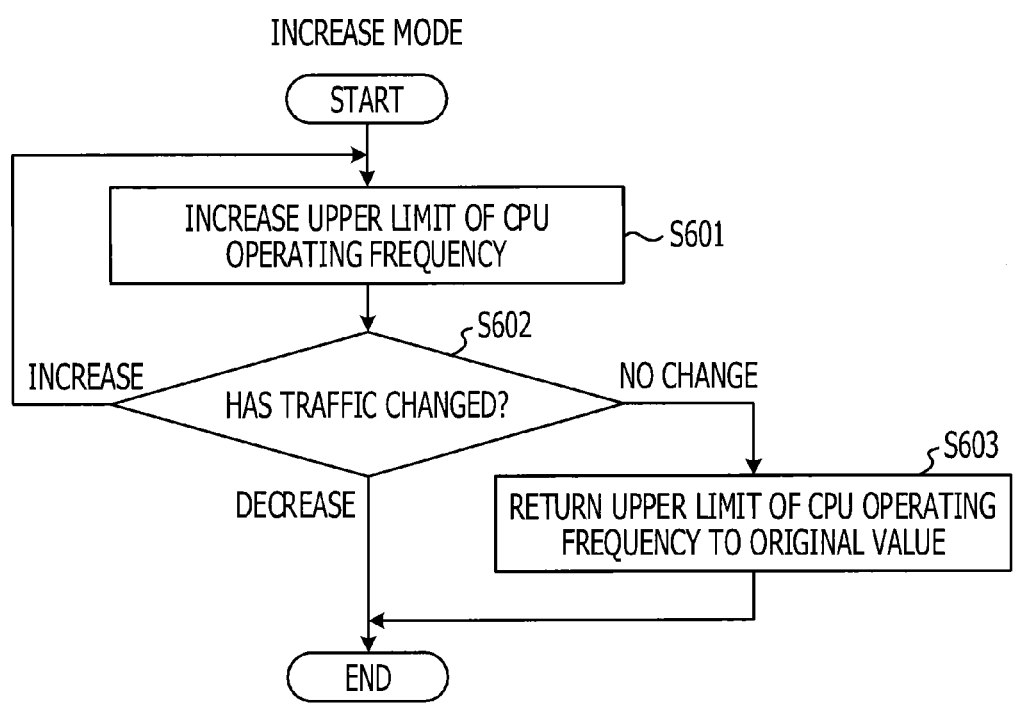
FIG. 10 is a flowchart of an "increase mode" according to the second embodiment.
Figure 11:
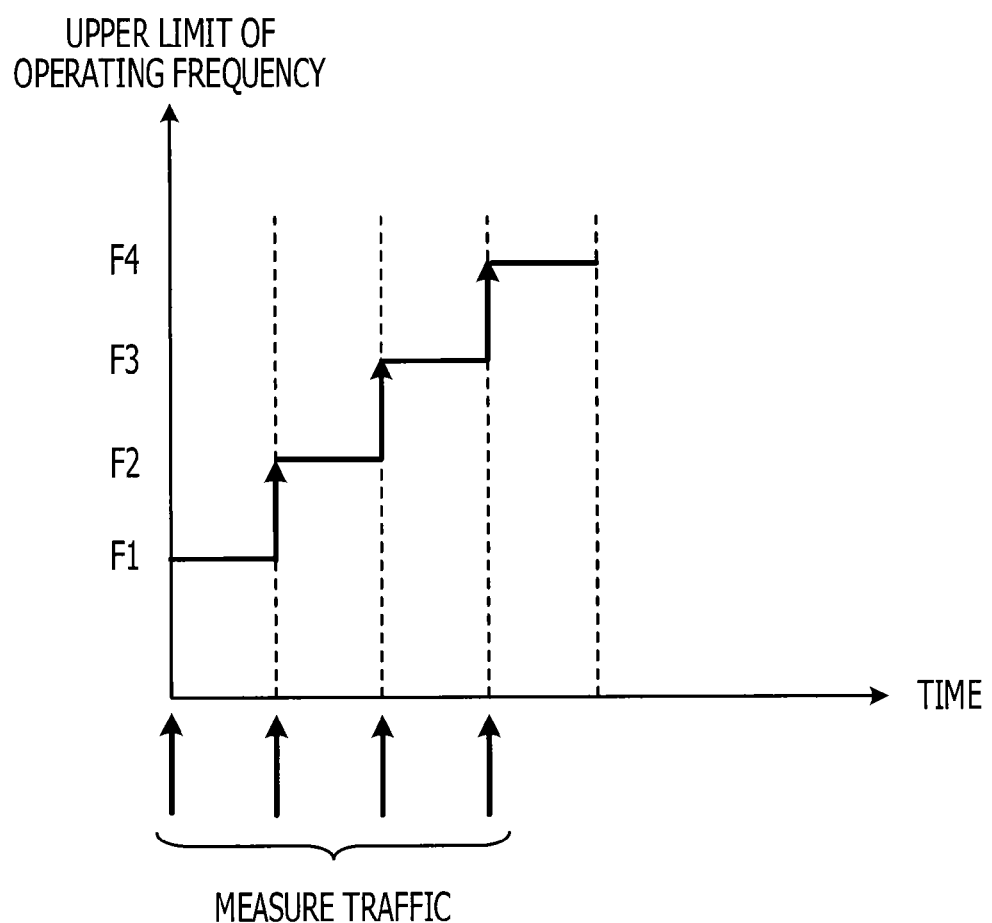
FIG. 11 is a graph illustrating changes in the upper limit of the operating frequency of a CPU according to the second embodiment.

FIG. 10 is a flowchart of the "increase mode" according to the second embodiment. FIG. 11 is a graph illustrating changes in the upper limit of the operating frequency of the CPU according to the second embodiment.

As illustrated in FIG. 10, after the start of the "increase mode", the controller 127 first instructs the CPU operating frequency control module 121 to increase the upper limit of the operating frequency of the CPU 101. Based on the instruction from the controller 127, the CPU operating frequency control module 121 increases the setting of the upper limit of the operating frequency of the CPU 101 by one rank (step S601). Then, the determining unit 126 determines, based on an amount of traffic acquired by the data traffic measuring unit 124, whether the amount of traffic of the communication module 123 has increased, has decreased, or has not changed relative to the amount of traffic of the previous measurement (step S602).

Here, if it is determined that the amount of traffic has increased ("increase" in step S602), it is presumed that the processing capability of the CPU 101 has become a bottleneck for communication. The controller 127 therefore instructs the CPU operating frequency control module 121 to increase the upper limit of the operating frequency of the CPU 101. Based on the instruction from the controller 127, the CPU operating frequency control module 121 further increases the setting of the upper limit of the operating frequency of the CPU 101 by one rank (step S601). That is, in this embodiment, the upper limit of the operating frequency of the CPU 101 is increased by one rank for each measurement of the amount of traffic until the amount of traffic no longer increases, as illustrated in FIG. 11.

However, if it is determined that the amount of traffic has not changed ("no change" in step S602), it is presumed that the processing capability of the CPU 101 has become no longer a bottleneck for communication because of the increase in the upper limit of the operating frequency of the CPU 101. The controller 127 therefore instructs the CPU operating frequency control module 121 to decrease the upper limit of the operating frequency of the CPU 101. Based on the instruction from the controller 127, the CPU operating frequency control module 121 changes the setting of the upper limit of the operating frequency of the CPU 101 to the immediately previous upper limit (step S603). That is, the immediately previous upper limit of the operating frequency is presumed to be the optimum value, and the setting of the upper limit of the operating frequency of the CPU 101 is returned to the immediately previous upper limit.

Also, if it is determined that the amount of traffic has decreased ("decrease" in step S602), the decrease is presumed to have been caused by an event irrelevant to the processing capability of the CPU 101 since the amount of traffic of the communication module 123 has decreased in spite of the increase in the upper limit of the operating frequency of the CPU 101. For example, the amount of traffic is presumed to have decreased because of a change in the communication environment and so on. For this reason, the controller 127 ends the "increase mode" without controlling the upper limit of the operating frequency of the CPU 101.

As described above, in this embodiment, when the amount of traffic tends to increase, the setting of the operating frequency of the CPU 101 is sequentially increased by one rank, regardless of whether the processing capability of the CPU 101 is a bottleneck for communication, until the amount of traffic no longer increases. Therefore, even if the processing capability of the CPU 101 is not a bottleneck for communication at the time of a measurement of the amount of traffic, the processing capability of the CPU 101 may be inhibited in advance from becoming a future bottleneck for communication.

[Decrease Mode]

Figure 12:
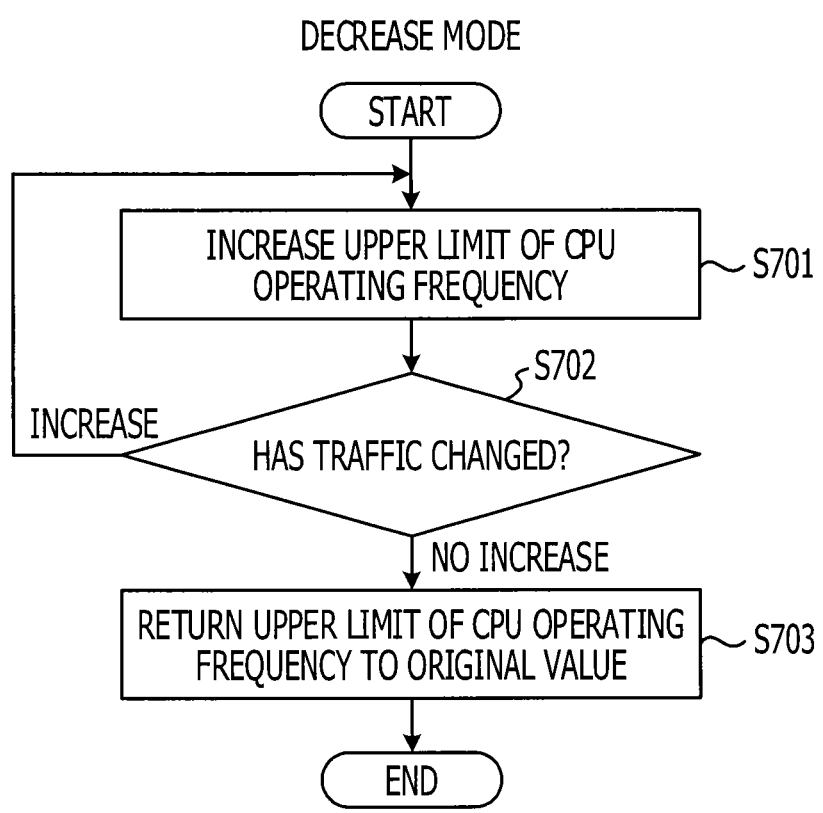
FIG. 12 is a flowchart of a "decrease mode" according to the second embodiment.

FIG. 12 is a flowchart of the "decrease mode" according to the second embodiment.

As illustrated in FIG. 12, after the start of the "decrease mode", the controller 127 first instructs the CPU operating frequency control module 121 to increase the upper limit of the operating frequency of the CPU 101. Based on the instruction from the controller 127, the CPU operating frequency control module 121 increases the setting of the upper limit of the operating frequency of the CPU 101 by one rank (step S701).

Then, the determining unit 126 determines, based on an amount of traffic acquired by the data traffic measuring unit 124, whether the amount of traffic of the communication module 123 has increased relative to the amount of traffic of the previous measurement (step S702).

Here, if it is determined that the amount of traffic has increased ("increase" in step S702), it is presumed that the processing capability of the CPU 101 has become a bottleneck for communication. The controller 127 therefore instructs the CPU operating frequency control module 121 to increase the upper limit of the operating frequency of the CPU 101. Based on the instruction from the controller 127, the CPU operating frequency control module 121 increases the setting of the upper limit of the operating frequency of the CPU 101 by one rank (step S701).

However, if it is determined that the amount of traffic has not increased ("not increase" in step S702), that is, if it is determined that the amount of traffic has decreased or the amount of traffic has not changed, it is presumed that the processing capability of the CPU 101 is not a bottleneck for communication. The controller 127 therefore instructs the CPU operating frequency control module 121 to decrease the upper limit of the operating frequency of the CPU 101. Based on the instruction from the controller 127, the CPU operating frequency control module 121 changes the setting of the upper limit of the operating frequency of the CPU 101 to the immediately previous upper limit (step S703). That is, the upper limit of the operating frequency set immediately before the current upper limit is presumed to be the optimum value, and the setting of the upper limit of the operating frequency of the CPU 101 is returned to the immediately previous upper limit.

As described above, in this embodiment, when the amount of traffic tends to decrease, the setting of the operating frequency of the CPU 101 is also sequentially increased by one rank, regardless of whether the processing capability of the CPU 101 is a bottleneck for communication, until the amount of traffic no longer increases. This may ensure that a situation where the processing capability of the CPU 101 is a bottleneck for communication is solved.

Third Embodiment

A third embodiment will be described below with reference to FIG. 13 and FIG. 14. However, descriptions of configurations and functions equivalent to those of the first and second embodiments will be omitted.

[Increase Mode]

Figure 13:
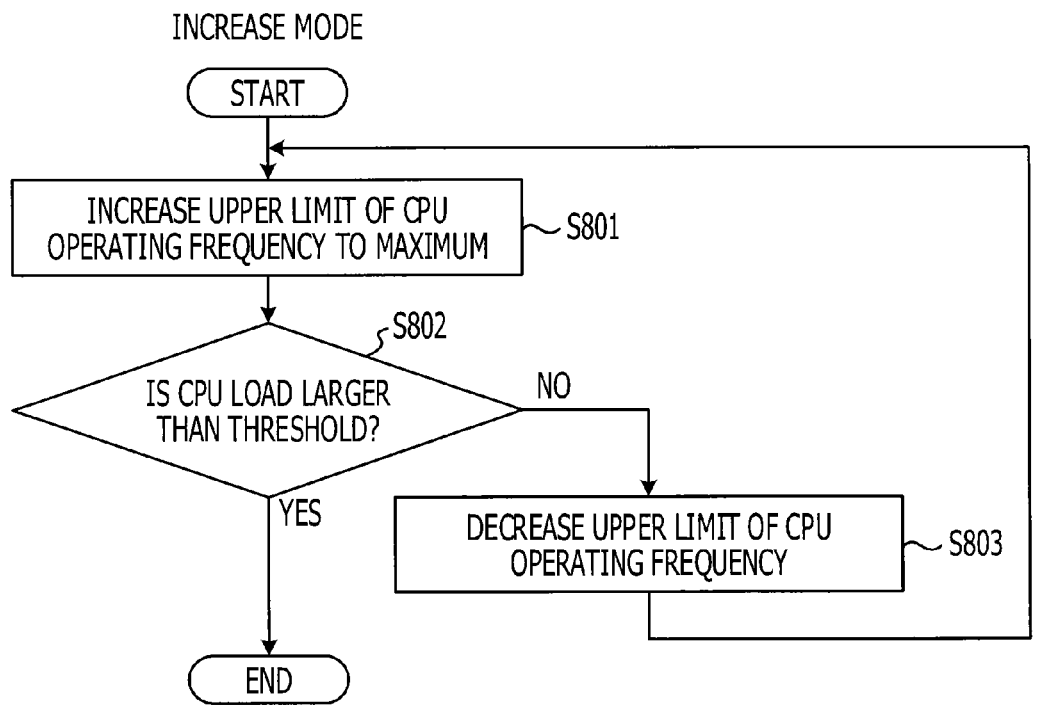
FIG. 13 is a flowchart of an "increase mode" according to a third embodiment.
Figure 14:
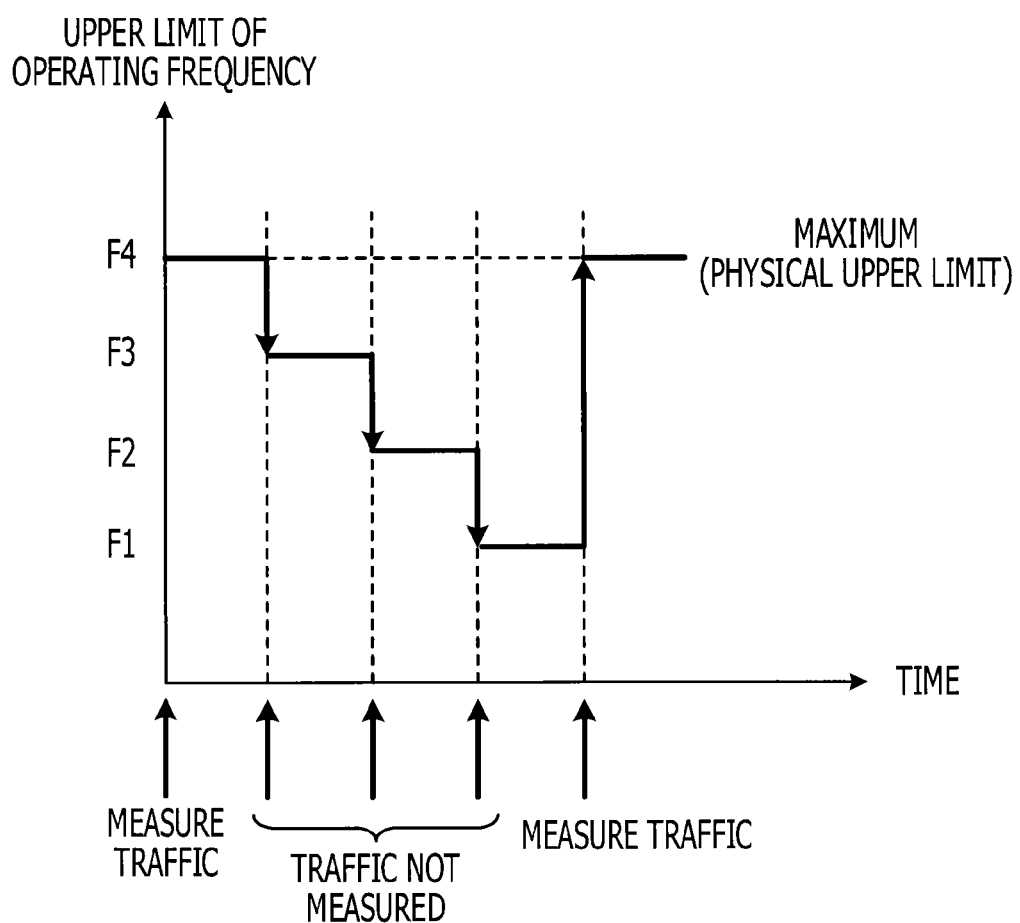
FIG. 14 is a graph illustrating changes in the upper limit of the operating frequency of the CPU according to the third embodiment.

FIG. 13 is a flowchart of the "increase mode" according to the third embodiment. FIG. 14 is a graph illustrating changes in the upper limit of the operating frequency of the CPU according to the third embodiment.

The "increase mode" according to the third embodiment is a modification of the "increase mode" according to the second embodiment.

As illustrated in FIG. 13, after the start of the "increase mode", the controller 127 first instructs the CPU operating frequency control module 121 to increase the upper limit of the operating frequency of the CPU 101. Based on the instruction from the controller 127, the CPU operating frequency control module 121 increases the setting of the upper limit of the operating frequency of the CPU 101 to a maximum (step S801). As the maximum, the physical upper limit that is set for each CPU 101, or a thermal upper limit that is set in consideration of heat generation of the CPU 101, for example, may be used.

Next, the determining unit 126 determines based on a CPU load acquired by the CPU load measuring unit 125 whether the CPU load is larger than a threshold set in advance (step S802).

Here, if it is determined that the CPU load is larger than the threshold ("Yes" in step S802), it is presumed that the processing capability of the CPU 101 is controlled to a minimum necessity, that is, the CPU 101 does not exhibit an excessive processing capability. For this reason, the determining unit 126 ends the "increase mode".

However, if it is determined that the CPU load is not larger than the threshold ("No" in step S802), it is presumed that the processing capability of the CPU 101 is not controlled to a minimum necessity, that is, the CPU 101 exhibits an excessive processing capability. For this reason, the controller 127 instructs the CPU operating frequency control module 121 to decrease the upper limit of the operating frequency of the CPU 101. Based on the instruction from the controller 127, the CPU operating frequency control module 121 decreases the upper limit of the operating frequency of the CPU 101 by one rank (step S803). That is, in this embodiment, when the amount of traffic tends to increase, first, the upper limit of the operating frequency of the CPU 101 is increased to the maximum, and then the upper limit of the operating frequency of the CPU 101 is sequentially decreased by one rank based on the CPU load, as illustrated in FIG. 13.

As described above, in this embodiment, when the amount of traffic tends to increase, the upper limit of the operating frequency of the CPU 101 is increased to the maximum first. This may ensure that a situation where the processing capability of the CPU 101 is a bottleneck for communication is avoided.

Besides, after the upper limit of the operating frequency of the CPU 101 is increased to the maximum, the setting of the upper limit of the operating frequency of the CPU 101 is sequentially decreased by one rank until the CPU load is larger than the threshold. Therefore, even if increasing the upper limit of the operating frequency of the CPU 101 causes a situation where the CPU 101 exhibits an excessive processing capability, the processing capability of the CPU 101 may be controlled to a minimum necessity by performing the "increase mode" according to this embodiment.

Fourth Embodiment

A fourth embodiment will be described below with reference to FIG. 15 and FIG. 16. However, descriptions of configurations and functions equivalent to those of the first to third embodiments will be omitted.

Figure 15:
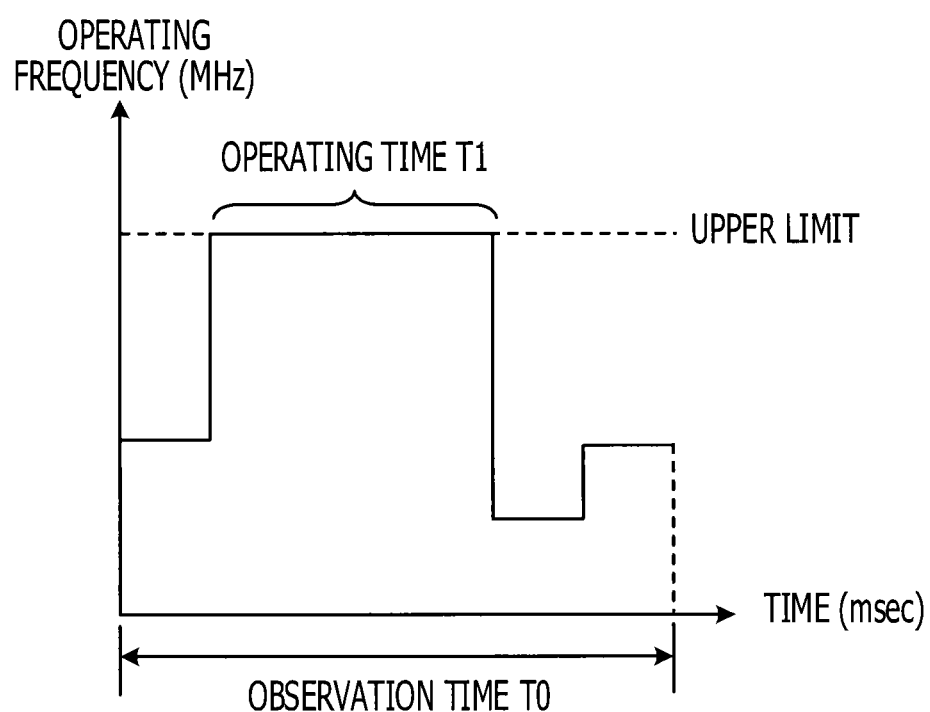
FIG. 15 is a graph illustrating the varying operating frequency of the CPU according to a fourth embodiment.

FIG. 15 is a graph illustrating variation of the operating frequency of the CPU according to the fourth embodiment.

In this embodiment, the CPU load is calculated based on histories (statistical information) of the variation of the operating frequency of the CPU 101. Specifically, as illustrated in FIG. 15, the proportion (T1/T0) of an operating time (T1), during which the operating frequency of the CPU 101 reaches the upper limit, in an observation time (T0), from the previous measurement to the current measurement, is used as the CPU load. Accordingly, a portable terminal device 100A according to this embodiment is configured as follows.

Figure 16:
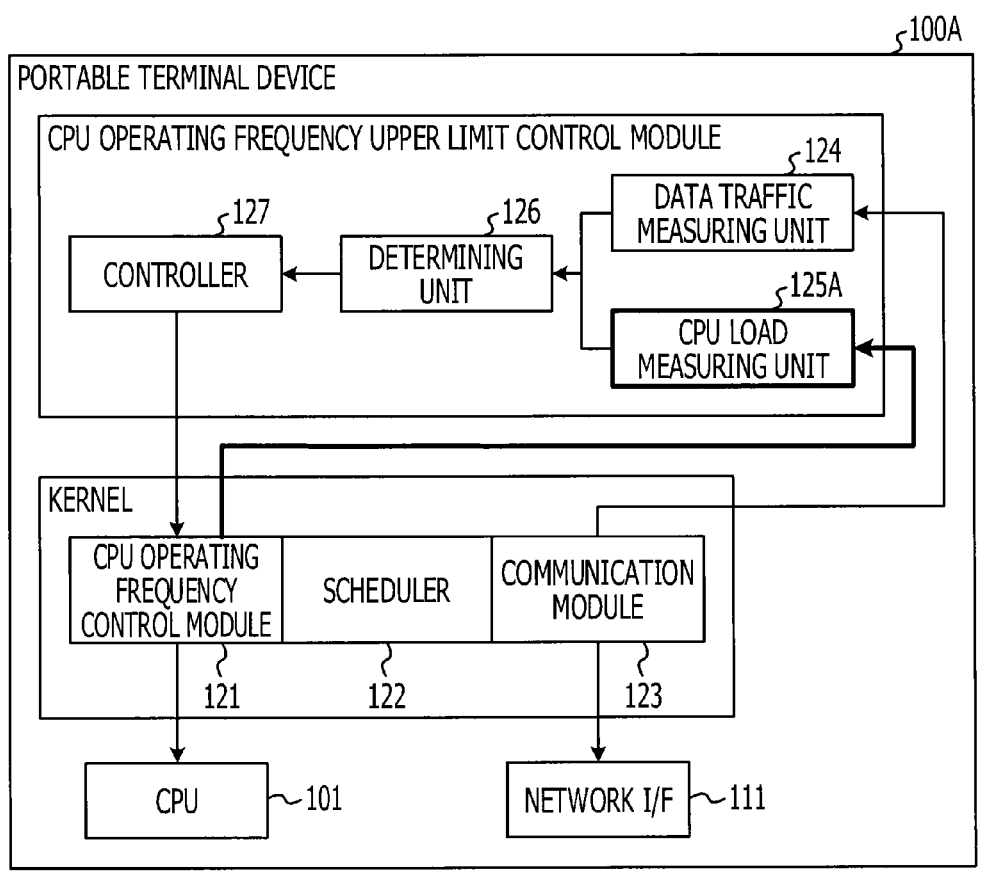
FIG. 16 is a schematic diagram of functional blocks of a portable terminal device according to the fourth embodiment.

FIG. 16 is a schematic diagram of functional blocks of the portable terminal device 100A according to the fourth embodiment.

As illustrated in FIG. 16, the CPU operating frequency control module 121 manages histories (statistical information) of the variation of the operating frequency of the CPU 101. The statistical information is information in which the operating time of the CPU 101 measured from the startup of the OS 1000 to the present is cumulated for every operating frequency. For example, statistical information is updated every 50 msec by the CPU operating frequency control module 121.

A CPU load measuring unit 125A calculates a CPU load based on statistical information for the operating frequency of the CPU 101 acquired from the CPU operating frequency control module 121. Specifically, the CPU load measuring unit 125A acquires statistical information for the operating frequency of the CPU 101 from the CPU operating frequency control module 121 each time the CPU load is measured. Furthermore, the CPU load measuring unit 125A calculates the difference between statistical information acquired from the previous measurement and statistical information acquired from the current measurement. Subsequently, the CPU load measuring unit 125A acquires the operating time T1 during which the operating frequency of the CPU 101 reaches the upper limit during the observation time T0, from the previous measurement to the current measurement, based on the difference of statistical information. Finally, the CPU load measuring unit 125A calculates the CPU load by using expression (2).

$$CPU\ \text{Load} = \frac{\text{Operating Time } T1(\text{sec})}{\text{Observation Time } T0(\text{sec})} \quad (2)$$

According to the present embodiment, based on the statistical information on the operating frequency of the CPU 101 updated for a short period of time, the proportion of the operating time (T1) during which the operating frequency of the CPU 101 reaches the upper limit in the observation time (T0) from the previous measurement to the current measurement is regarded as the CPU load. Accordingly, the CPU load of each observation period may be grasped more accurately. Moreover, the statistical information on the operating frequency of the CPU 101 may be easily read from middleware or applications. For this reason, use of statistical information for the operating frequency of the CPU 101 allows implementation in the portable terminal device 100 to be simple.

Although the proportion of the operating time during which the operating frequency of the CPU 101 reaches the upper limit in the observation time is used as the CPU load in this embodiment, the present disclosure is not limited to this. For example, any value that is calculated from the statistical information on the operating frequency of the CPU 101 and has a correlation with the CPU load, such as the average of the operating frequencies of the CPU 101, may be used as the CPU load.

Fifth Embodiment

A fifth embodiment will be described below with reference to FIG. 17 to FIG. 19. However, descriptions of configurations and functions equivalent to those of the first to third embodiments will be omitted.

FIGS. 17A to 17C are graphs illustrating the varying operating frequency of the CPU 101 according to the fifth embodiment.

In the fifth embodiment, the CPU load is calculated based on both the ratio of the operating frequency (actual operating frequency) relative to the upper limit of the operating frequency of the CPU 101, and the CPU utilization. Specifically, as illustrated in FIGS. 17A to 17C, the average of so-called weighted CPU utilization obtained by multiplying the CPU utilization by the ratio of the operating frequency relative to the upper limit of the operating frequency of the CPU is used as the CPU load. Accordingly, a portable terminal device 100B according to this embodiment is configured as follows.

Figure 18:
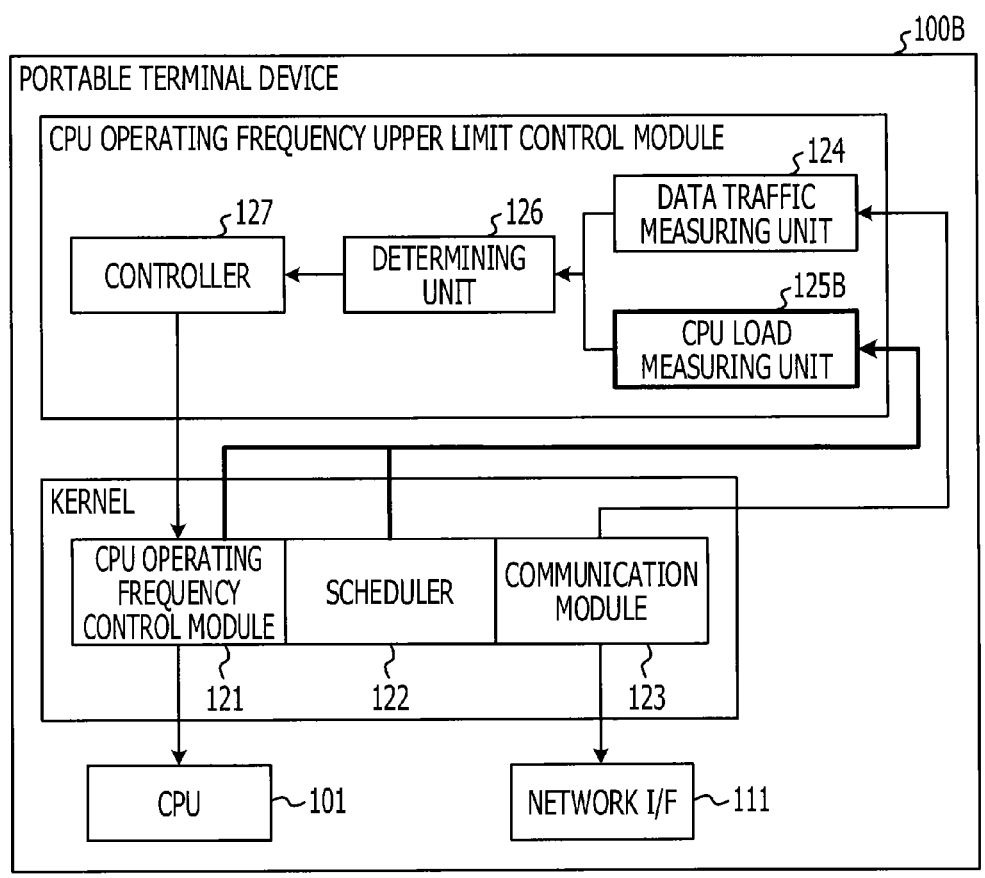
FIG. 18 is a schematic diagram of functional blocks of a portable terminal device according to the fifth embodiment.

FIG. 18 is a schematic diagram of functional blocks of the portable terminal device 100B according to the fifth embodiment.

As illustrated in FIG. 18, the CPU operating frequency control module 121 manages a history (statistical information) of the variation of the operating frequency of the CPU 101. The statistical information is information in which the operating times of the CPU 101 measured from the startup of the OS 1000 to the present are cumulated for every operating frequency. For example, statistical information is updated every 50 msec by the CPU operating frequency control module 121.

A CPU load measuring unit 125B calculates a CPU load based on statistical information on the operating frequency of the CPU 101 acquired from the CPU operating frequency control module 121 and CPU utilization acquired from the scheduler 122. Specifically, the CPU load measuring unit 125 calculates a CPU load by using expression (3) for every observation time from the previous measurement to this measurement.

$$CPU \text{ Load} = \frac{\sum \frac{\text{Operating Frequency (MHz)}}{\text{Operating Frequency Upper Limit (MHz)}} \times CPU \text{ Utilization}}{\text{Observation Time (sec)}} \quad (3)$$

Expression (3) divides each observation period into minute sections, multiplies the ratio of an actual operating frequency relative to the upper limit of the operating frequency by CPU utilization for each minute section, adds together the resulting products over the observation period, and divides the resulting sum by the observation time.

According to the present embodiment, the CPU load is obtained not only by using the CPU utilization but in consideration of the ratio of the operating frequency relative to the upper limit of the operating frequency. Accordingly, the CPU load of each observation period may be grasped more accurately.

Although the CPU load measuring unit 125B calculates a CPU load in this embodiment, the present disclosure is not limited to this. For example, the function for calculating a CPU load may be given to the kernel.

[Modification]

Figure 19:
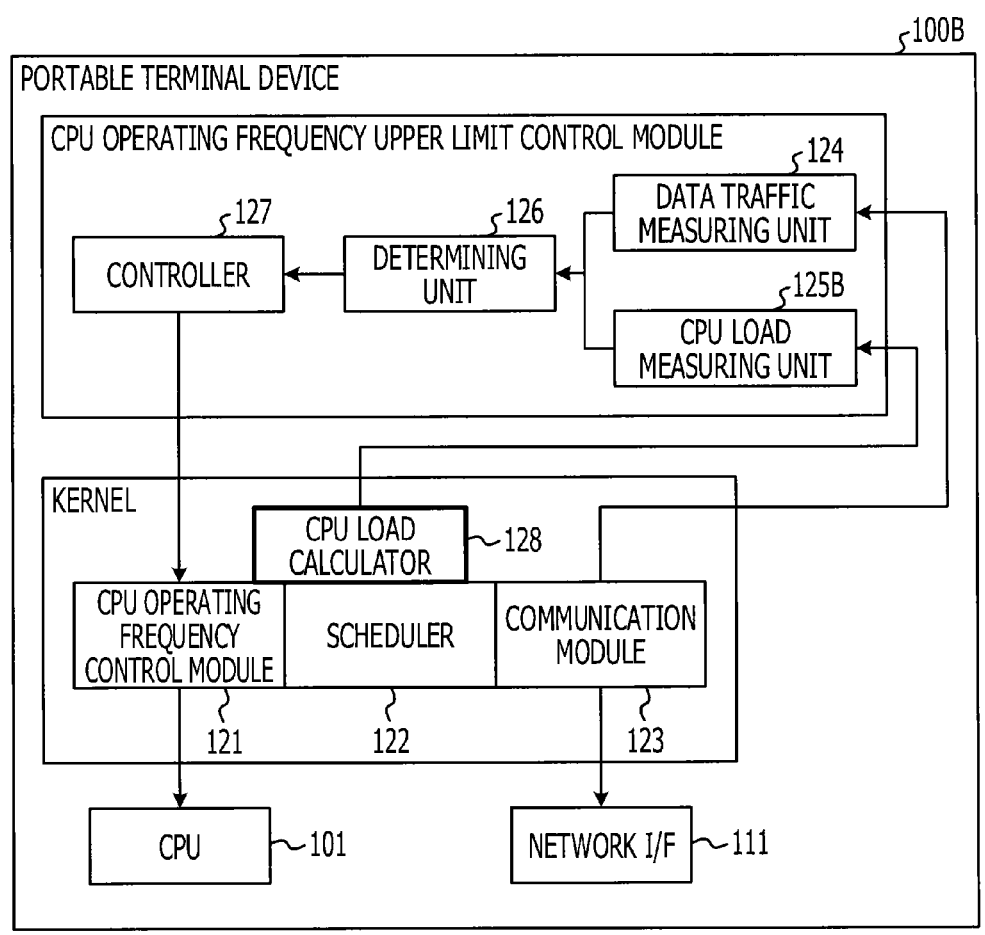
FIG. 19 is a schematic diagram of functional blocks of a portable terminal device according to a modification of the fifth embodiment.

FIG. 19 is a schematic diagram of functional blocks of the portable terminal device 100B according to the fifth embodiment.

As illustrated in FIG. 19, the portable terminal device 100B according to this modification includes, as a functional block of the kernel, a CPU load calculator 128 for calculating a CPU load. If the CPU load calculator 128 is included as a functional block of the kernel, an operation to be performed in a very short period of time by using expression (3) may be satisfactorily performed. Note that the CPU load calculator 128 is implemented so that the CPU 101 reads the kernel of the OS 1000 into the main memory 102 and executes the kernel read into the main memory 102.

Sixth Embodiment

A sixth embodiment will be described below with reference to FIG. 20 and FIG. 21. However, descriptions of configurations and functions equivalent to those of the first to third embodiments will be omitted.

Figure 20:
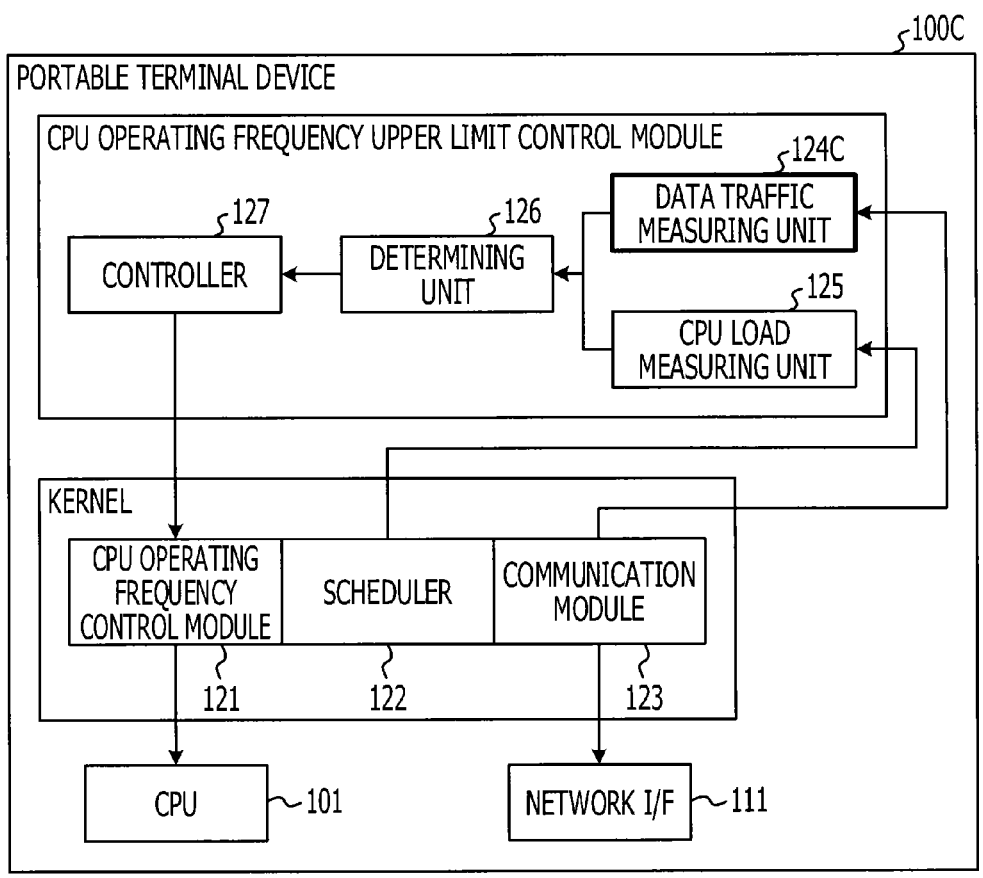
FIG. 20 is a schematic diagram of functional blocks of a portable terminal device according to a sixth embodiment.

FIG. 20 is a schematic diagram of functional blocks of a portable terminal device 100C according to the sixth embodiment.

In this embodiment, the amount of traffic is calculated based on the number of packets coming in and going back out through the network I/F 111.

The communication module 123 records the cumulative value of the number of packets that have come in and gone back out through the network I/F 111 from when the OS 1000 starts until to the present. Then, the communication module 123 calculates the average size of packets (packet size) that comes in and goes back out through the network I/F 111.

The data traffic measuring unit 124C calculates the difference between the cumulative value of the number of packets acquired from the previous measurement and the cumulative value of the number of packets acquired from the current measurement, that is, the number of packets that come in and go back out through the network I/F 111 in an observation period of time from the previous measurement to the current measurement. Then, the data traffic measuring unit 124C calculates amount of traffic per unit time based on the number of packets that have come in and gone back out through the network I/F 111 in the observation period of time and the average packet size calculated by the communication module 123. Specifically, the data traffic measuring unit 124C calculates the amount of traffic per unit time by using expression (4).

$$\text{Traffic (bps)} = \frac{\text{Number of Packets} \times \text{Packet Size (bit)}}{\text{Observation Time (sec)}} \quad (4)$$

According to this embodiment, the amount of traffic for every period of observation time is calculated based on the cumulative value of the number of packets recorded by the communication module 123 and the packet size managed by the communication module 123. Therefore, calculation of the amount of traffic per unit time may be realized by just using functions standardly included in the OS 1000.

Seventh Embodiment

A seventh embodiment will be described below. However, descriptions of configurations and functions equivalent to those of the first to third embodiments will be omitted.

Figure 21:
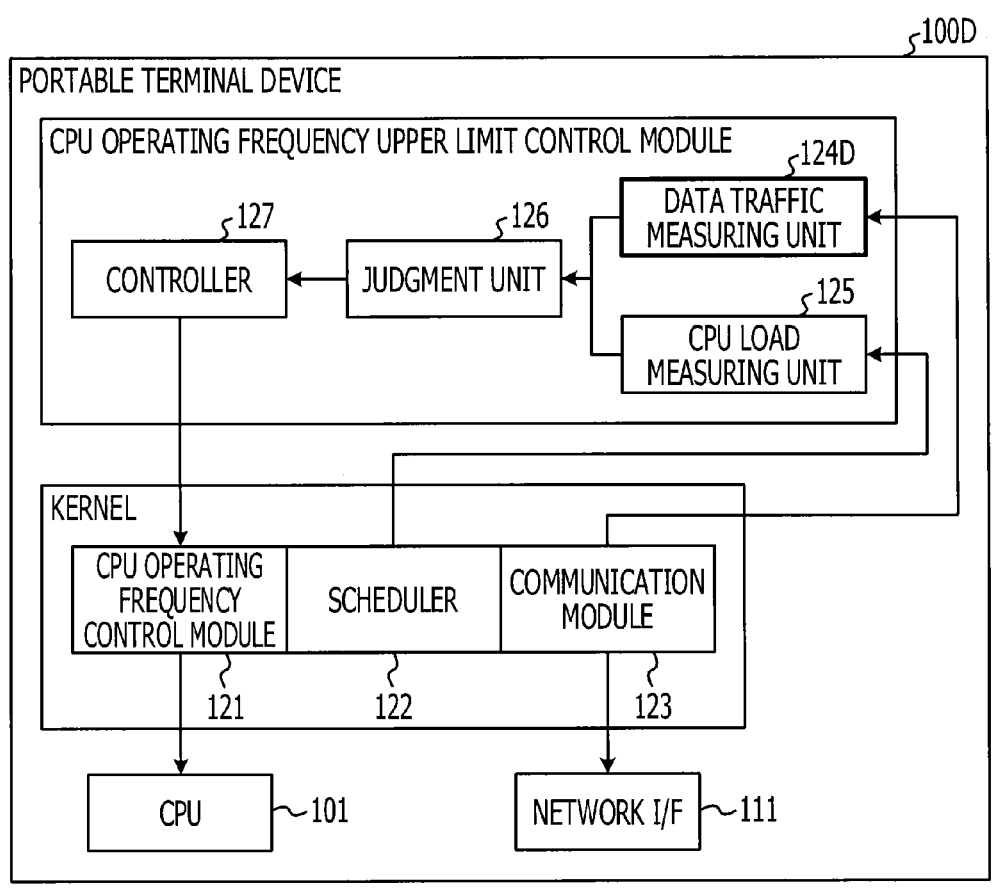
FIG. 21 is a schematic diagram of functional blocks of a portable terminal device according to a seventh embodiment.

FIG. 21 is a schematic diagram of functional blocks of a portable terminal device 100D according to the seventh embodiment.

In this embodiment, the amount of traffic per unit time is calculated based on the window size of the transmission control protocol (TCP).

The communication module 123 manages the window size and the round trip time (RTT) for every TCP connection.

A data traffic measuring unit 124D calculates the amount of traffic per unit time based on the window size and RTT for the TCP connection acquired from the communication module 123. Specifically, the data traffic measuring unit 124D calculates the throughput of every TCP connection by using expression (5) first.

$$TCP \text{ Throughput (bps)} = \frac{TCP \text{ Window Size } (KB) \times 8}{RTT(\text{sec})} \quad (5)$$

Subsequently, the data traffic measuring unit 124D calculates the total throughput of all the TCP connections as the amount of traffic by using expression (6).

$$\text{Traffic (bps)} = \sum_{i=0}^{n} i\text{-th } TCP \text{ Connection Throughput} \quad (6)$$

According to this embodiment, the throughput of every TCP connection is calculated based on the window size and RTT for the TCP, and the total throughput of all the TCP connections is obtained as the amount of traffic. This enables acquisition of the amount of traffic without calculating the average amount of traffic per unit time.

Eighth Embodiment

An eighth embodiment will be described below with reference to FIG. 22 and FIG. 23. However, descriptions of configurations and functions equivalent to those of the first to third embodiments will be omitted.

In this embodiment, the upper limit of the operating frequency of the CPU 101 is decided based on the operating time (the CPU load) of an application program having a function involving communication (hereinafter referred to as a "communication application"), the operating time (CPU processing) of the kernel of the OS 1000 associated with the communication application, and the bandwidth available for communication of a portable terminal device 100E.

Examples of the communication application include a so-called weather application. A weather application is designed to notify the portable terminal device 100E of weather information based on the position of the portable terminal device 100E and the time, for example. In the weather application, communication occurs when position information is notified from the portable terminal device 100E to a server and when weather information is notified from the server to the portable terminal device 100E. The weather application, however, is only an example of a communication application, and this embodiment is not limited to the weather application.

[Functional Blocks of Portable Terminal Device 100E]

Figure 22:
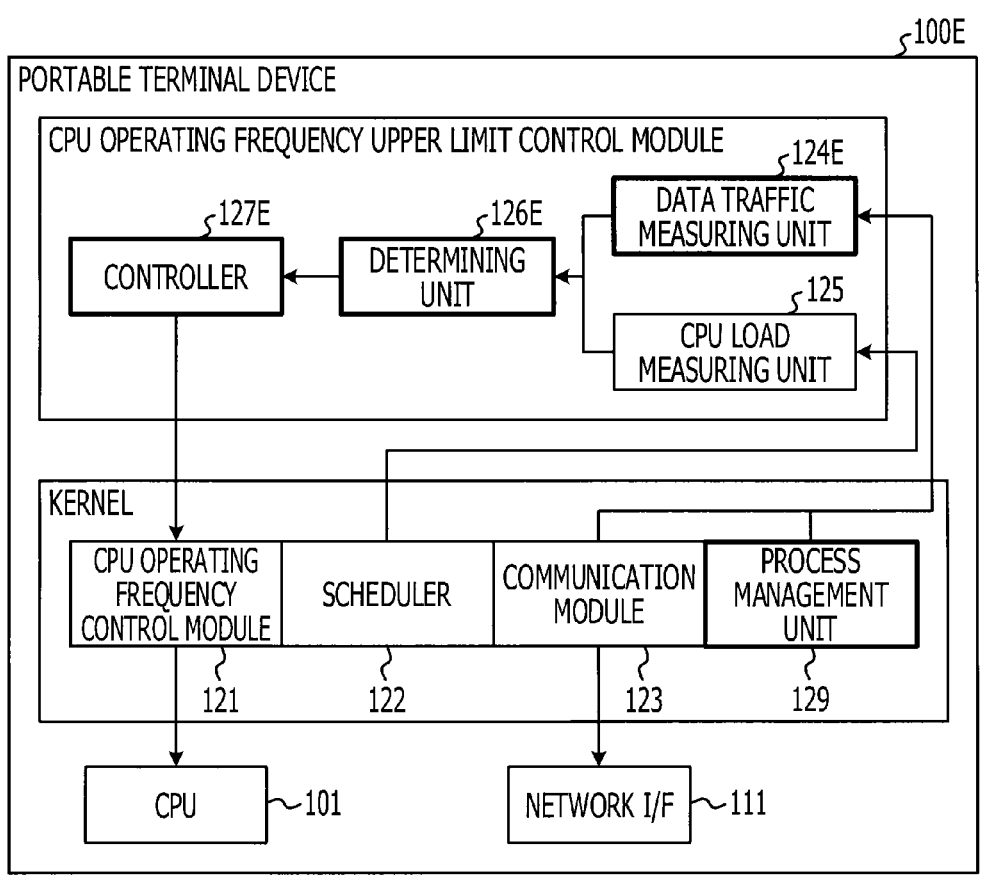
FIG. 22 is a schematic diagram of functional blocks of a portable terminal device according to an eighth embodiment.

FIG. 22 is a schematic diagram of functional blocks of the portable terminal device 100E according to the eighth embodiment.

As illustrated in FIG. 22, the portable terminal device 100E according to this embodiment further includes a process management unit 129. The process management unit 129 is implemented so that the CPU 101 reads the kernel of the OS 1000 into the main memory 102 and executes that kernel read into the main memory 102.

The process management unit 129 manages the operating status of processes performed by the CPU 101. Specifically, the process management unit 129 observes the operating statuses of the processes performed by the CPU 101 at regular intervals, and updates cumulative values of the operating times for every process, for example, a user mode operating time (Utime) and a kernel mode operating time (Stime). The user mode operating time is the cumulative value of operating times of an application program. The kernel mode operating time is the cumulative value of operating times of the kernel of the OS 1000 used in association with running of processes of the application program, for example.

Based on the operating statuses of processes managed by the process management unit 129, a data traffic measuring unit 124E calculates the operating time per unit time of a communication application and the operating time per unit time of the kernel of the OS 1000 associated with the communication application. Additionally, based on the operating time per unit time of a communication application and the operating time per unit time of the kernel of the OS 1000 associated with the communication application, the data traffic measuring unit 124E calculates a theoretical maximum of amount of traffic per unit time of the wireless link generated by the communication application, that is, theoretical maximum amount of traffic.

Based on the bandwidth available for communication of the portable terminal device 100E managed by the communication module 123 and the theoretical maximum amount of traffic calculated by the data traffic measuring unit 124E, a determining unit 126E determines whether the bandwidth is larger than the theoretical maximum amount of traffic.

Based on a result of the determination made by the determining unit 126E, a control unit 127E instructs the CPU operating frequency control module 121 to increase or decrease the upper limit of the operating frequency of the CPU 101.

[CPU Operating Frequency Upper Limit Control Processing]

Figure 23:
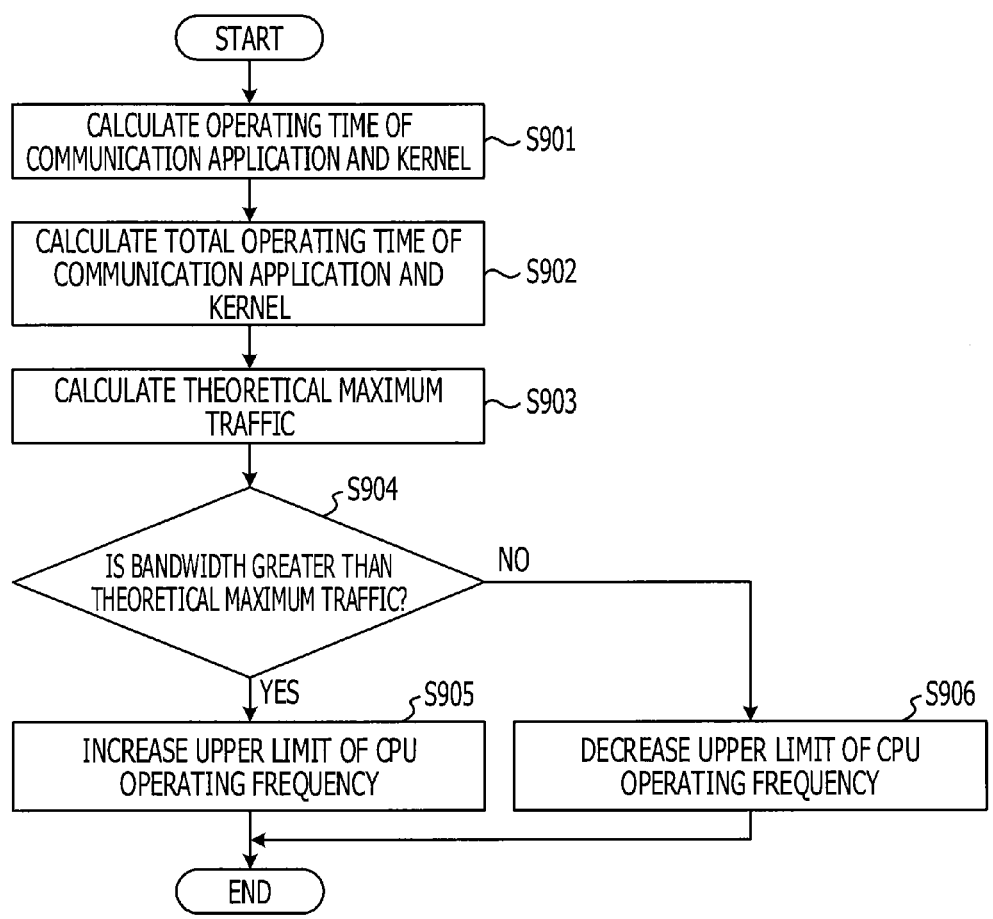
FIG. 23 is a flowchart of CPU operating frequency upper limit control processing according to the eighth embodiment.

FIG. 23 is a flowchart of CPU operating frequency upper limit control processing according to the eighth embodiment.

As illustrated in FIG. 23, first, based on the operating statuses of processes managed by the process management unit 129, the data traffic measuring unit 124E calculates the operating time per unit time of a communication application and the operating time per unit time of the kernel of the OS 1000 associated with the communication application (step S901).

Then, the data traffic measuring unit 124E calculates the total time of the operating time per unit time of the communication application and the operating time per unit time of the kernel of the OS 1000 associated with the communication application (step S902).

Then, based on the total time of the operating time per unit time of a communication application and the operating time per unit time of the kernel of the OS 1000 associated with the communication application, the data traffic measuring unit 124E calculates a theoretical maximum of amount of traffic per unit time of the wireless link generated by the communication application, that is, a theoretical maximum amount of traffic (step S903). Specifically, the data traffic measuring unit 124E calculates an amount of traffic generated when all the total time of the operating time per unit time of the communication application and the operating time per unit time of the kernel of the OS 1000 associated with the communication application is assigned to communication processing, that is, the theoretical maximum amount of traffic.

Then, based on the bandwidth available for communication of the portable terminal device 100E managed by the communication module 123 and the theoretical maximum amount of traffic calculated by the data traffic measuring unit 124E, the determining unit 126E determines whether the bandwidth is larger than the theoretical maximum amount of traffic (step S904).

Here, if it is determined that the bandwidth is larger than the theoretical maximum amount of traffic (Yes in step S904), it is presumed that the processing capability of the CPU 101 is a bottleneck for communication. For this reason, the control unit 127E instructs the CPU operating frequency control module 121 to increase the upper limit of the operating frequency of the CPU 101. Based on the instruction from the controller 127E, the CPU operating frequency control module 121 increases the setting of the upper limit of the operating frequency of the CPU 101 by one rank (step S905).

However, if it is determined that the bandwidth is not larger than the theoretical maximum amount of traffic (No in step S904), it is presumed that the processing capability of the CPU 101 is not a bottleneck for communication. For this reason, the control unit 127E may instruct the CPU operating frequency control module 121 to decrease the upper limit of the operating frequency of the CPU 101. If the instruction is given from the control unit 127E, the CPU operating frequency control module 121 decreases the setting of the upper limit of the operating frequency of the CPU 101 by one rank (step S906).

As described above, in this embodiment, if the bandwidth available for communication of the portable terminal device 100E is larger than the theoretical maximum traffic of the communication application, it is determined that the processing capability of the CPU 101 is a bottleneck, that is, the CPU 101 exhibits a processing capability to such an extent that the secured bandwidth is not satisfactorily used, and thus the setting of the upper limit of the operating frequency of the CPU 101 is increased. Therefore, the amount of traffic generated by the communication module 123 increases, and, as a result, the power consumption of the portable terminal device 100E may be controlled.

Furthermore, if the bandwidth available for communication of the portable terminal device 100E is smaller than the theoretical maximum traffic of the communication application, it is determined that the processing capability of the CPU 101 is not a bottleneck, that is, it is presumed that there is room to decrease the upper limit of the operating frequency of the CPU 101, and thus the setting of the upper limit of the operating frequency of the CPU 101 is decreased. Therefore, power consumption may be restrained.

Note that, in this embodiment, if the bandwidth is larger or smaller than the theoretical maximum traffic of a communication application, the setting of the upper limit of the operating frequency of the CPU 101 is sequentially increased or decreased by one rank. The present disclosure, however, is not limited to this. For example, based on the operating time (CPU load) of a communication application and the operating time (CPU load) of the kernel of the OS 1000, the upper limit itself of the operating frequency of the CPU 101 may be decided. That is, the operating frequency of the CPU 101 at which the bandwidth is equivalent to the theoretical maximum traffic is calculated and may be set as the upper limit of the operating frequency of the CPU 101.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed by a processor included in an information processing apparatus, the information processing apparatus including a central processing unit (CPU) that executes an application relevant to a communication other than a baseband processing, the method comprising:
    determining whether a load of the CPU is larger than a first threshold;
    if determining that the load is not larger than the first threshold, increasing or decreasing an upper limit of an operating frequency of the CPU and determining whether the load is larger than the first threshold again;
    if determining that the load is larger than the first threshold, optimizing a setting of the upper limit based on a change of traffic occurred when by increasing or decreasing the upper limit;
    measuring amounts of traffic at different times;
    calculating a variability index indicating a rate of variability of traffic using the measured amounts of traffic;
    determining whether the variability index is smaller than a second threshold;
    measuring an amount of traffic again and suppressing optimizing of the setting of the upper limit until the amount of traffic has stabilized, when determining that the variability index is not smaller than the second threshold; and
    executing the optimizing of the setting of the upper limit again by determining whether the load is larger than the first threshold, when determining that the variability index is not smaller than the second threshold.

2. The method according to claim 1, wherein
the setting of the upper limit of the operating frequency of the CPU includes
    increasing the upper limit of the operating frequency of the CPU again, when the amount of traffic increases after making the upper limit of the operating frequency increase.

3. The method according to claim 2, wherein
the setting of the upper limit of the operating frequency of the CPU includes
    decreasing the upper limit of the operating frequency of the CPU, when the amount of traffic does not change after making the upper limit of the operating frequency increase.

4. The method according to claim 1, wherein
the setting of the upper limit of the operating frequency of the CPU includes
    decreasing the upper limit of the operating frequency of the CPU again, when the amount of traffic does not change after the making the upper limit of the operating frequency decrease.

5. The method according to claim 4, wherein
the setting of the upper limit of the operating frequency of the CPU includes
    increasing the upper limit of the operating frequency of the CPU, when the amount of traffic decreases after making the upper limit the operating frequency decrease.

6. The method according to claim 1, further comprising:
    determining, based on utilization of the CPU, whether a controlling of a variation in the upper limit of the operating frequency of the CPU is performed.

7. The method according to claim 1, wherein
the increasing of the upper limit of the operating frequency includes increasing the upper limit of the operating frequency to a maximum value of the operating frequency of the CPU, and
the method further comprises:
    decreasing, from the maximum value, the upper limit of the operating frequency of the CPU, when determining that the load is not larger than the first threshold.

8. The method according to claim 1, wherein the CPU is provided aside from a baseband large scale integrated (LSI) circuit that executes the baseband processing in accordance with a wireless protocol.

9. An information processing apparatus, comprising:
    a central processing unit (CPU) that execute an application relevant to a communication other than a baseband processing; and
    a processor coupled to the CPU and configured to:
        determine whether a load of the CPU is larger than a first threshold;
        if the determination is that the load is not larger than the first threshold, increase or decrease an upper limit of an operating frequency of the CPU and determine whether the load is larger than the first threshold again;

if the determination is that the load is larger than the first threshold, optimize a setting of the upper limit based on a change of traffic occurred by increasing or decreasing the upper limit;

measure amounts of traffic at different times;

calculate a variability index indicating a rate of variability of traffic using the measured amounts of traffic;

determine whether the variability index is smaller than a second threshold;

measure an amount of traffic again and suppressing optimizing of the setting of the upper limit until the amount of traffic has stabilized, when determining that the variability index is not smaller than the second threshold; and execute the optimizing of the setting of the upper limit again by determining whether the load is larger than the first threshold, when determining that the variability index is smaller than the second threshold.

10. A non-transitory computer-readable storage medium that stores a control program that causes a processor included in an information processing apparatus to execute a process, the information processing apparatus including a central processing unit (CPU) that executes an application relevant to a communication other than a baseband processing, the process comprising:

determining whether a load of the CPU is larger than a first threshold;

if determining that the load is not larger than the first threshold, increasing or decreasing an upper limit of an operating frequency of the CPU and determining whether the load is larger than the first threshold again;

if determining that the load is larger than the first threshold, optimizing a setting of the upper limit based on a change of traffic occurred by increasing or decreasing the upper limit;

measuring amounts of traffic at different times;

calculating a variability index indicating a rate of variability of traffic using the measured amounts of traffic;

determining whether the variability index is smaller than a second threshold;

measuring an amount of traffic again and suppressing optimizing of the setting of the upper limit until the amount of traffic has stabilized, when determining that the variability index is not smaller than the second threshold; and executing the optimizing of the setting of the upper limit again by determining whether the load is larger than the first threshold, when determining that the variability index is smaller than the second threshold.

11. The method according to claim 1, wherein the setting of the upper limit of the operating frequency of the CPU includes:

calculating a first operating time of the application relevant to the communication and a second operating time of an operating system (OS) kernel in association with the application;

calculating a total value of the first operating time and the second operating time; and calculating, as the first threshold, a theoretical maximum amount of traffic of the wireless link generated by the application, based on the calculated total value, wherein the determining whether the load of the CPU is larger than the first threshold includes determining whether an available bandwidth with which the information processing apparatus communicates is larger than the theoretical maximum amount of traffic.

12. The method according to claim 11, wherein the optimizing the setting of the upper limit includes making the upper limit of the operating frequency of the CPU increase, when the amount of traffic of the wireless link corresponding to the available bandwidth is larger than the theoretical maximum amount of traffic.

13. The method according to claim 11, wherein the optimizing the setting of the upper limit includes making the upper limit of the operating frequency of the CPU decrease, when the amount of traffic of the wireless link corresponding to the available bandwidth is smaller than the theoretical maximum amount of traffic.

14. The method according to claim 1, wherein the calculated variability index is based on a difference between a first amount of traffic and a second amount of traffic in relation to the first amount of traffic.

15. The method according to claim 1, wherein the calculated variability index is based on an amount of traffic with respect to different time periods.

16. The information processing apparatus according to claim 9, wherein the calculated variability index is based on an amount of traffic with respect to different time periods.

17. The method according to claim 1, wherein the load of the CPU is calculated by dividing an operating time during which the operating frequency of the CPU reaches the upper limit by an observation time from a previous measurement of statistic information of the operating frequency to a current measurement of the statistic information.

18. The method according to claim 1, wherein the load of the CPU is calculated by a process including:

dividing each observation period into minute sections;

multiplying a ration of an actual operating frequency relative to the upper limit of the operating frequency by the CPU utilization for each minute section;

calculating a summation of all multiplication results; and acquiring the load of the CPU by dividing the summation by the each observation period.

* * * * *